United States Patent
Migdal et al.

[11] Patent Number: 5,991,437
[45] Date of Patent: Nov. 23, 1999

[54] MODULAR DIGITAL AUDIO SYSTEM HAVING INDIVIDUALIZED FUNCTIONAL MODULES

[75] Inventors: Alexander Migdal; Alexei Lebedev; Michael Petrov; Alexander Zhilyaev, all of Princeton, N.J.

[73] Assignee: Real-Time Geometry Corporation, Princeton, N.J.

[21] Appl. No.: 08/678,804

[22] Filed: Jul. 12, 1996

[51] Int. Cl.[6] .................................................. G06K 9/00
[52] U.S. Cl. ......................................... 382/154; 348/139
[58] Field of Search .................................... 382/106, 154, 382/285; 348/42, 47, 48, 49, 50, 139; 356/3

[56] References Cited

U.S. PATENT DOCUMENTS

| | | | |
|---|---|---|---|
| 4,297,034 | 10/1981 | Ito et al. | 356/394 |
| 4,575,805 | 3/1986 | Moermann et al. | 364/474 |
| 4,627,734 | 12/1986 | Rioux | 356/376 |
| 4,800,270 | 1/1989 | Blais | 250/235 |
| 4,800,271 | 1/1989 | Blais | 250/235 |
| 4,819,197 | 4/1989 | Blais | 364/715.06 |
| 4,948,258 | 8/1990 | Caimi | 356/376 |
| 5,102,223 | 4/1992 | Uesugi et al. | 356/376 |
| 5,102,224 | 4/1992 | Uesugi et al. | 356/376 |
| 5,104,227 | 4/1992 | Uesugi et al. | 356/376 |
| 5,193,120 | 3/1993 | Gamache et al. | 382/1 |
| 5,196,900 | 3/1993 | Pettersen | 356/141 |
| 5,218,427 | 6/1993 | Koch | 356/376 |
| 5,259,037 | 11/1993 | Plunk | 382/154 |
| 5,321,766 | 6/1994 | Fraas et al. | 382/152 |
| 5,377,011 | 12/1994 | Koch | 356/376 |
| 5,416,591 | 5/1995 | Yoshimura et al. | 356/376 |
| 5,444,537 | 8/1995 | Yoshimura et al. | 356/376 |
| 5,446,548 | 8/1995 | Gerig et al. | 356/375 |
| 5,446,549 | 8/1995 | Mazumder et al. | 356/376 |
| 5,489,950 | 2/1996 | Masuda | 348/744 |
| 5,506,683 | 4/1996 | Yang et al. | 356/376 |
| 5,513,276 | 4/1996 | Theodoracatos | 382/154 |
| 5,699,444 | 12/1997 | Palm | 382/154 |

FOREIGN PATENT DOCUMENTS 1295039  1/1992  Canada .

OTHER PUBLICATIONS

Rioux, Marc et al., "White Laser, Synced Scan," *IEEE Computer Graphics and Applications*, vol. 13, No. 3, pp. 15–17, May 1993.

Primary Examiner—Christopher S. Kelley
Attorney, Agent, or Firm—Kenyon & Kenyon

[57] ABSTRACT

A system for high accuracy calibration of a scanning system, which provides an object for calibration of a known geometry, such as a plane or a sphere. Upon that object is marked a pattern of points or geometric shapes, such as a set of equilateral triangles or their vertices. A set of computer programmed elements process photographic images of the object (containing a depiction of the pattern of geometric objects) and scanned images of the object to calibrate to high precision parameters, including a focal point relationship value for scanning systems which use a camera as an image collector (which describes the relationships between the focal point of the lens and the light/image collection device of the camera), a set of values to correct for distortion of the lens, the relative distance between the image collector and the scanner light source and also an initial angle to determine light position scanning. The known geometric constraints of the object allow the location of the object to be determined by photographic images. By scanning the object and computing 3D X,Y,Z coordinates for those points against a constraint that the X,Y,Z coordinates fit onto the surface of the object, the system calibrates parameters pertaining to the relative distances between the image collector and light source, an initial angle of rotation for systems which employ movable light sources and other parameters. The system is applied to multiple camera scanning systems to calibrate rotation matrices and translation vectors which facilitate the joining of the scanned data. The system further facilitates the design of flexible and movable scanning systems, such as portable scanners.

4 Claims, 21 Drawing Sheets

OTHER PUBLICATIONS

Carlbom, Ingrid, et al., "Modeling and analysis of empirical data in collaborative environments" *Communications of the ACM,* vol. 35, No. 6, Jun. 1992, p. 74.

Jones, P.F. et al., "Comparison of three three–dimensional imaging systems," *J. Opt. Sco. Am. A,* vol. 11, No. 10, Oct. 1994, pp. 2613–2612.

Hausler, Gerd et al., "Light sectioning with large depth and high resolution," *Applied Optics,* vol. 27, No. 24, Dec. 15, 1988, pp. 5165–5169.

Motamedi, M. Edward et al., "Miniaturized micro–optical scanners," *Optical Engineering,* vol. 33, No. 11, Nov. 1994, pp. 3616–3623.

Rioux, Marc et al., "Design of a large depth of view three–dimensional camera for robot vision," *Optical Engineering,* vol. 26, No. 12, Dec. 1987, pp. 1245–1250.

Trepte, Oliver et al., "Computer control for galvanometer scanner in a confocal scanning laser microscope," *Optical Engineering,* vol. 33, No. 11, Nov. 1994, pp. 3774–3780.

Strand, T.C., "Optical three–dimensional sensing for machine vision," *Optical Engineering,* vol. 24, No. 1, Jan./Feb. 1985, pp. 33–40.

Busch, David D., "Getting the Picture," *Windows Sources,* Nov. 1995, pp. 114–136.

Marshall, G.F., "Scanner refinements inspire new uses", *Laser Focus World,* Jun. 1994, pp. 2–6.

Ludwiszewski, Alan, "Standards for Oscillatory Scanners," *General Scanning Inc.,* Feb. 1993, pp. 1–21.

"Cyberware Corporate Backgrounder", *Cyberware WWW Support* (*Internet Site*), Jan. 16, 1996 (last update).

Brosens, Pierre J., "Scanning speed and accuracy of moving magnet optical scanners", *Optical Engineering,* vol. 34 No. 1, Jan. 1995, pp. 200–207.

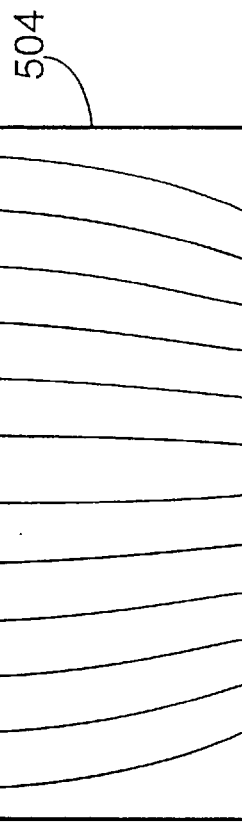
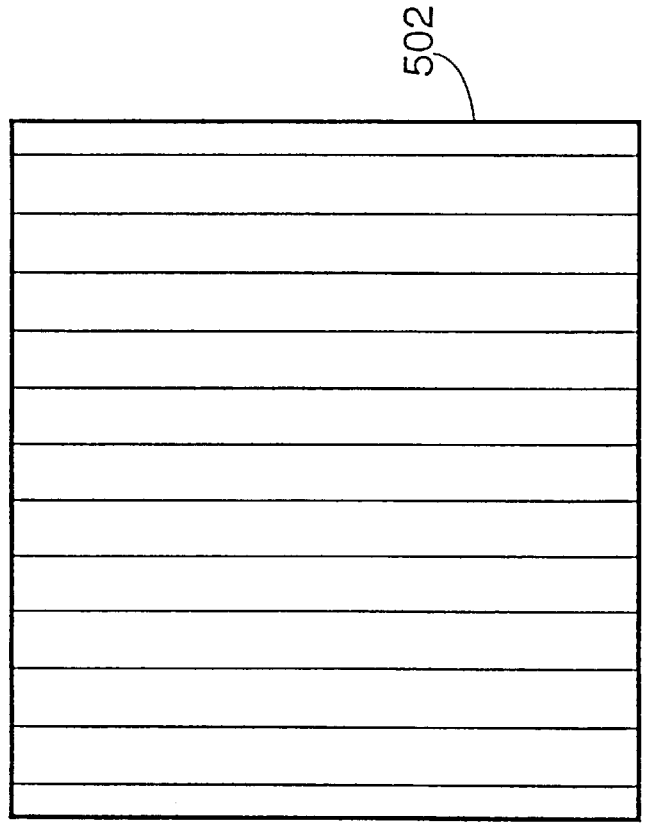
FIG. 5b
FIG. 5a

MODULAR DIGITAL AUDIO SYSTEM HAVING INDIVIDUALIZED FUNCTIONAL MODULES

CROSS-REFERENCE TO RELATED APPLICATIONS

This application claims the benefit of the filing date, under 35 U.S.C. § 120, of pending commonly-owned U.S. patent application Ser. No. 08/620,689, filed on Mar. 21, 1996, which is expressly incorporated by reference herein. This application is also related to commonly-owned U.S. application entitled "Portable 3-D Scanning System and Method For Rapid Shape Digitizing and Adaptive Mesh Generation," filed on even date herewith, which is expressly incorporated by reference herein.

FIELD OF THE INVENTION

This invention relates to computer-aided three dimensional ("3D") scanning and measuring systems, in particular to a system and method for calibrating initial settings and positions used in devices for measuring and reproducing objects by scanning and shape digitizing.

BACKGROUND OF THE INVENTION

Speed, accuracy, and portability have been recurrent and difficult to achieve goals for devices that scan, measure or otherwise collect data about 3D objects for purposes such as reproduction. With the advent of computers, such devices have useful application in many fields, such as digital imaging, computer animation, topography, reconstructive and plastic surgery, dentistry, architecture, industrial design, anthropology, biology, internal medicine, milling and object production, and other fields. These computer-aided systems obtain three-dimensional, contour, color and other information about an object and then transform it to a useful digitized form.

One type of available system applies optical techniques and uses the principles of geometric triangulation to obtain 3D data concerning an object. A triangulation system projects beams of light on an object and then determines 3D spatial locations for points where the light reflects from the object. Ordinarily, the reflected light bounces off the object at an angle relative to the light source. The system collects the reflection information from a location relative to the light source and then determines the coordinates of the point or points of reflection by applying principles of triangulation.

Some triangulation systems currently available either project a single beam of light or a single laser stripe to collect data. The single beam of light system (also known as a "laser dot" system) projects a beam of light which, when reflected, produces a single point of reflection. A laser stripe system (also known as a "scan line" system) projects a plane of light toward the object which projects on the object as a line and reflects from the light collection position as a curvilinear-shaped set of points describing one contour line of the object. Scan line systems typically employ a 2D imager, such as a charged coupled device (CCD) camera, to collect images of the contour information. When the light plane (i.e., a laser stripe) projects, the camera collects the reflection of multiple points depicting the contour of an object at a location that is at a distance from the laser source and at an angle relative to it. The triangulation technique uses the image of the contour points to determine a 3D location for each contour point and thereby collects data to describe and reproduce the object.

Scanning systems, such as those that collect 3D shape data by triangulation, have particular difficulty obtaining highly accurate three-dimensional data readings. As triangulation systems determine the 3D location of a point based on the relative locations of light source and image collector, it is important to determine their relative positions with high accuracy. The angle of the beam (or light plane) as it projects from the light source and reflects to the image collector is also important to the triangulation calculation and must be known with precision. If the relative positions of light source and image collector and the projection angle of the beam are not accurately determined, then the ultimate calculations of the 3D data points for the object will in turn suffer. Thus, it is important to carefully calibrate the relative distances between light source and image collector. It is further necessary to calibrate an angle position for the beam of light as it projects toward the object from the light source.

In addition, cameras present calibration problems when they are used as image collectors in scanning systems. A camera, such as a CCD camera, employs an optical lens system. Generally, the curvature of the lens distorts the images it collects in some manner. The image collected by the camera of the reflected light beam as it bounces from an object will not always describe its actual position. For example, towards the edge of the image there are distortions which bend and curve it. Without a calibration technique to correct for such distortions, the triangulation calculation simply incorporates the distortions to create inaccurate data readings for the points that describe the object's contour.

The use of a camera as image collector also presents a further difficulty in determining an accurate calibration of a value relative to the focal point of the lens. The focal point for a camera lens is a point on the axis of the lens at which all incident parallel light rays converge or appear to diverge. The focal point exists at a location that is a distance away from the principal part of the lens. Focal distance, also known as focal length, is that distance (typically expressed in millimeters) from the principal point of the lens to its focal point. The location of the focal point for light reflecting into the camera can play a part in some triangulation techniques and it is therefore important to determine such a location with high accuracy. By knowing the location of the focal point in relation to the location of the light collector or photocollector (e.g. CCD chip within the camera), the x, y location of a point on a collected 2D image can be used to determine 3D X,Y,Z location of the data point on the object.

However, to create an accurate point reading, it is necessary in some systems to accurately calibrate the focal point location and its relational distance to the photocollector. Generally, lens manufacturers calibrate a lens' focal distance, but those generic factory-determined values often do not provide the most accurate reading for any particular lens and camera configuration. In addition, when the system incorporates a zoom lens, focal distance must be determined for any zoom setting.

The difficulties inherent in precisely determining the initial settings and positions in triangulation systems have contributed to the inflexible solutions seen in some currently available systems—solutions that hamper general use and effectiveness. Some embodiments of the scan line-type system attach a CCD camera and laser light source to a rotating arm or a moving platform. During scanning, either the object moves on a known path relative to the camera and laser or the camera and laser, together, move around the object. Although such a system provides fixed and determinable positions between light source and image collector, such systems usually depend on a fixed rotational movement to collect data and typically use a bulky, mechanical system for high-precision positioning. Rescaling flexibility can be very limited in these systems, because of the mechanical positioning devices; e.g., a scanner designed for objects the size of a basketball may not be useful for scanning apple-sized objects. In addition, the scanning times for such systems are relatively slow, because mechanical positioning devices require time to move and position the camera and laser set up.

Some laser stripe triangulation systems currently available are further limited because the laser stripe stays at a fixed angle relative to the camera and the system makes its calculations based on the cylindrical coordinates of its rotating platform. The mathematical simplicity in such a projection system complicates the hardware portion of these devices as they typically depend on the bulky rotational platforms mentioned. Also, the simplified geometry does not generally allow for extremely refined reproduction of topologically nontrivial objects, such as objects with holes in them (e.g., a tea pot with a handle). Generally, full realization of triangulation scanning with a non-restrictive geometry has not been achieved. One aspect that has limited such flexible scanning is the creation of inflexible systems which need to "hardwire" the parameters used for triangulation, such as the relative positions between laser source and image collector.

The use of inflexible calibration techniques also places upper limits on scanning speed. The laser stripe triangulation systems which use a rotational platform are constrained by the speed at which the platform or arm can rotate the object without moving or shaking it. Some systems take 15 or so seconds to complete a 360° scan. A target object, such as a person or an animal, may have difficulty staying still for such a scan time.

Another limitation of the fixed system is that the laser stripe triangulation systems typically can generate only one light stripe per camera image. As laser stripe triangulation systems generate a single laser stripe and project that stripe upon the object, the CCD camera captures an image of the stripe in a frame image—one laser stripe per CCD camera frame. Thus, the collection of laser information in some systems is subject to the speed limitations of the camera. Such systems create large amounts of extraneous data to process in the scanning process. A flexible calibration system allows for movement of beams of light, which has several advantages. Flexible scanning systems can generate multiple scan lines in a given frame image (which reduces the amount of information to process) and can maintain the camera in a stationary position while moving only the beam of light to scan the image (which frees it from hardware-intensive configurations).

Scanning systems which employ multiple cameras to perform full scans of an object also can benefit from an accurate method of calibration. Such scanning systems attempt to collect shape information concerning the entire object—360° around the object plus its top and bottom. Each of the multiple cameras in a full scanning system scans a part of the object and a computer pieces together the data for each of these parts to create a unified whole through a process such as a "gluing" algorithm.

One multiple camera scanning system (not using triangulation) uses stereoscopic means and employs several CCD cameras located at known distances from each other. The captured images are processed with a pattern recognition system which maps the various points of an object captured by the cameras, thereby obtaining the shape/contour information. One such advanced stereoscopic system uses 16 CCD cameras. This type of system must also project a special grid on an object to obtain reference points for gluing a complete 3D picture. A flexible calibration system would permit such a scanning solution without the use of a grid.

Scanning systems based on laser light and triangulation techniques have also been employed to create full scanning systems. Each camera in such a system should be calibrated to position it in reference to a laser for scanning. Each camera should also be calibrated to compensate for lens distortion and to locate a precise focal distance value. For gluing the scanned data pieces together to form a unified representation of the object, it is also useful to know the relative positions between each camera in the system.

Generally, the systems currently available do not provide any flexible and rapid means for calibrating positions in the multiple camera systems. The scanning systems available continue to use the inflexible technique of placing the cameras at fixed intervals, mounting the cameras on bulky platforms and tower apparatus to keep fixed the positional relationships.

Thus, for devices that scan, measure or otherwise collect data about an object, it would be a substantial advance if a system to calibrate could be created to enable a scanner to gather highly accurate data concerning a 3D object. It would also be an advance if the system and method could enable more flexible scanning systems to be developed, such as portable scanning systems. Employing such an advanced system of calibration, adjustable and portable scanning systems could calibrate both the position of the light source and camera at the time of scanning. A system for flexible calibration also enables the creation of full scanning systems with multiple cameras that do not depend on rigorous grids or fixed positioning methods.

SUMMARY OF THE INVENTION

The present invention provides a system and method for calibrating the initial settings and positions for equipment used in 3D scanning and measuring devices. The exemplary system uses the hardware elements of a scanning system, a computer and computer programmed elements to calibrate the initial settings and positions of such equipment. In addition, the present invention provides objects to be analyzed by the system. As the system analyzes an object, the present invention provides that the initial values and settings for calibration, such as the relative position between image collector and light source and the initial rotation angle for the light source, can be determined based on the geometric constraints presented by the object and its markings. In addition, the present invention includes a system and method to calibrate focal point position and lens distortion correction values for scanning devices that collect images with a camera and lens. The present invention can be adapted to scanners with fixed light sources (in which the relative light source stays constant in relation to the camera) and scanners with movable light sources (such as those which use a rotating mirror or mirrors).

The object for scanning can be one of any known or determinable geometry, such as a flat plane or a sphere. The present invention provides that there is a predetermined pattern or set of geometric patterns printed or otherwise fixed onto the object, such as a triangle or a collection of triangles or a set of points representing the vertices of a triangle or triangles. Characteristics about the geometric patterns are known, such as the distances between the vertices of the triangles. In one exemplary embodiment, the set of geometric patterns is a set of equidistant points and the distance between them is known. By allowing the system of the present invention to scan and take photographic images of the object and perform computations concerning the set of geometric patterns, the system of the present invention can calibrate the initial settings and positions necessary for high-accuracy scanning.

In calibration, it is an aspect of the present invention that after the system gathers information concerning the object for calibration, a set of computer programmed elements perform separate operations to determine the different initial setting parameters. Although it is understood that all the parameters can be calibrated at once by a single computer procedure, by determining different initial setting parameters in distinct processes, greater accuracy can be achieved in calibration. In an exemplary embodiment, the system calibrates parameters in distinct processes. One set of programmed elements determines the initial settings to adjust for lens distortion. A second set of programmed elements determines a value for the camera's focal point in relation to the photocollector (a value used in triangulating calculations). A third set of programmed elements determines the relative position of camera and light source and values to determine angle positions for the projected laser stripe or line.

The system and method for calibration presented provides a number of advantages. First, the calibration system provides the ability to configure adjustable and portable scanning systems, because relative positions of the light source, light positioner and image collector can be determined quickly and easily. As such, the laser light source, light positioner and the image collector can be placed without a strict need to know their exact positions. The user can adjust the positions of the light source, light positioner and scanner at any time and at any place, and simply calibrate these positions with the system and process provided by this invention. Such an adjustment system frees the underlying scanning system from the cumbersome use of rotating platforms and immobile towers that fix the position of camera and laser in other scanning devices.

The system and method of the present invention also permits easy changes of scanning equipment. In systems using a camera and lens system as the image collector, the camera or its lens can now be changed quickly and easily without affecting the ability to scan. If a new lens is used, the present invention provides that lens correction values can be quickly generated to compensate for that lens' distortion and new focal point values can also be quickly determined. The present invention also provides that the lens correction and focal point values be recalculated if the user changes cameras.

The calibration system and method of the present invention further provides for a scanning system that is not limited to a laser stripe (or dot) which must remain at a fixed angle relative to the camera. In calibration, the system provides that an initial angle position be calibrated. From that initial angle position, the laser angle can be moved relative to the camera during the scan. As the laser angle moves about the object, the camera can stay stationary to collect scanned data. This ability to move the laser position frees the system configuration, for example, from designs which employ gantries and mechanical arms and constantly move the camera and laser as a set in relation to the object. Thus, the calibration system of the present invention enables creation of more portable, adjustable systems which do not depend on equipment such as rotating platforms to move camera and laser.

The system and method for calibration also enables the development of adjustable and portable multi-camera scanning systems. Through the use of a single geometric object such as a sphere, an entire set of scanners can be calibrated both for the relative position of camera and relevant laser and for the relative position of each camera. The ability to calibrate many cameras at once allows for adjustable multi-camera system design and facilitates reconstruction of the image pieces in the gluing process. This ability to calibrate quickly and accurately also frees the multi-camera system from designs which fix the cameras to stationary towers. A user can change the number of scanners used in a multiple camera scanning system at any time and easily recalibrate the new set up for accurate scanning. The detailed description provides further description below.

BRIEF DESCRIPTION OF THE DRAWINGS

FIG. 5a Depicts an actual image of a set of parallel lines.

FIG. 5b Depicts an image of a set of parallel lines collected by a camera with a lens system that distorts.

DETAILED DESCRIPTION

A. Objects for Calibration

Figure 1:
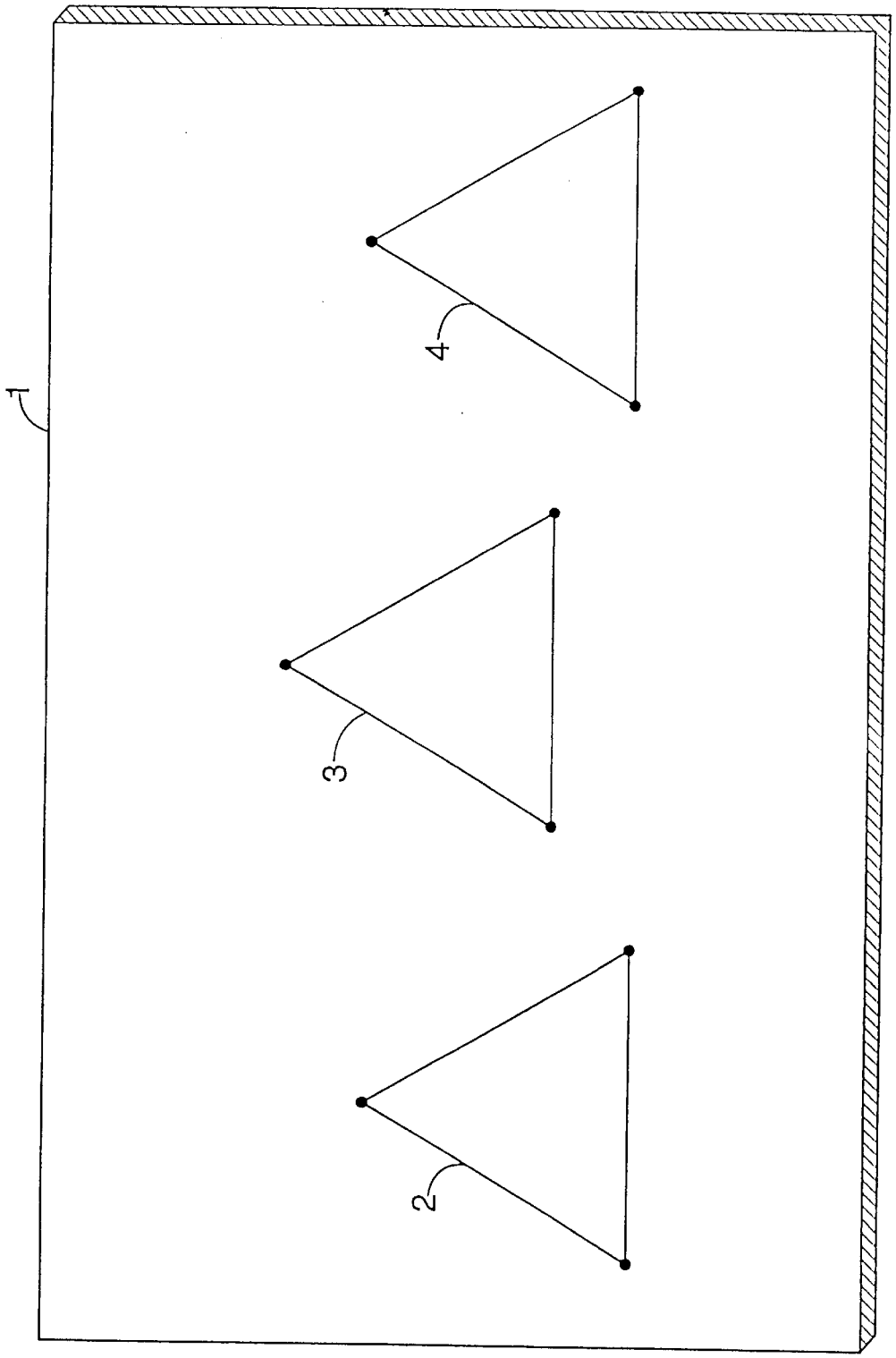
FIG. 1 Depicts an exemplary planar object containing geometric shapes used for calibration in a scanning system according to the present invention.

To calibrate, the present invention provides that a scanning system take photo images and scans of an object having a set of geometric patterns and, then, fit the scanning parameters so that the data and the parameters match the known geometric constraints of the object. FIG. 1 depicts one exemplary object 1. The object 1 has the geometric form of a flat plane upon which there are a number of geometric shapes. In FIG. 1 the exemplary geometric shapes are equilateral triangles 2, 3, and 4. In an alternative embodiment, the geometric shape used is a right triangle. Within each triangle the distances between each vertex is known. For purposes of calibration according to the present invention it is not necessary that information concerning the relative distances between the triangles be known. For purposes of an exemplary embodiment, object 1 can be fabricated from any flat surface, paper, cardboard, plastic, metal, wood or any surface which provides a flat planar structure for the geometric shapes depicted. The geometric pattern can be any markings of known geometry (e.g., known lengths and angles). In the example using triangles, the geometric pattern can be a single triangle or it could be several triangles.

Figure 2A:
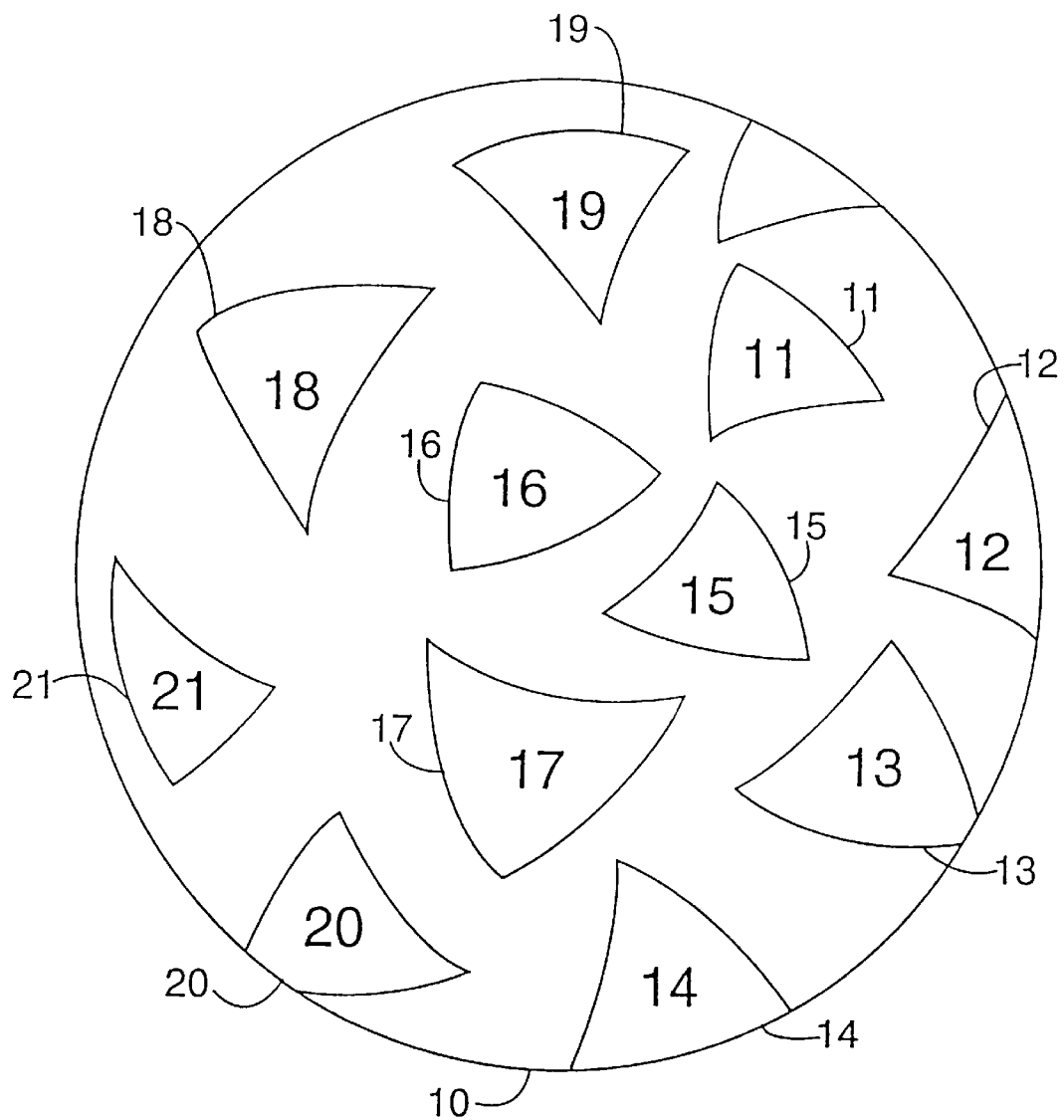
FIG. 2a Depicts an exemplary spherical object containing geometrical shapes used for calibration according to the present invention.

FIG. 2*a* depicts a second exemplary object 10 which can also be used for calibration according to the system and method of the present invention. The object 10 is a 3D sphere (the 2D image in FIG. 2*a* showing one view) of a known radius upon which is marked a number of geometric shapes. For purposes of an exemplary embodiment, the sphere has a radius of 15 centimeters. In FIG. 2*a*, the geometric shapes are equilateral triangles 11, 12, 13, 14, 15, 16, 17, 18, 19, 20 and 21. Each triangle side length is known. As described above, the triangles can also be a set of right triangles with distances known between vertices. Although only one view of the sphere is presented in FIG. 2*a*, it is understood that a plurality of triangles are distributed on the entire 3D surface of the sphere. For ease of identification, each shape can be marked with a number (as in FIG. 2*a*) or some other identifier.

Figure 2B:
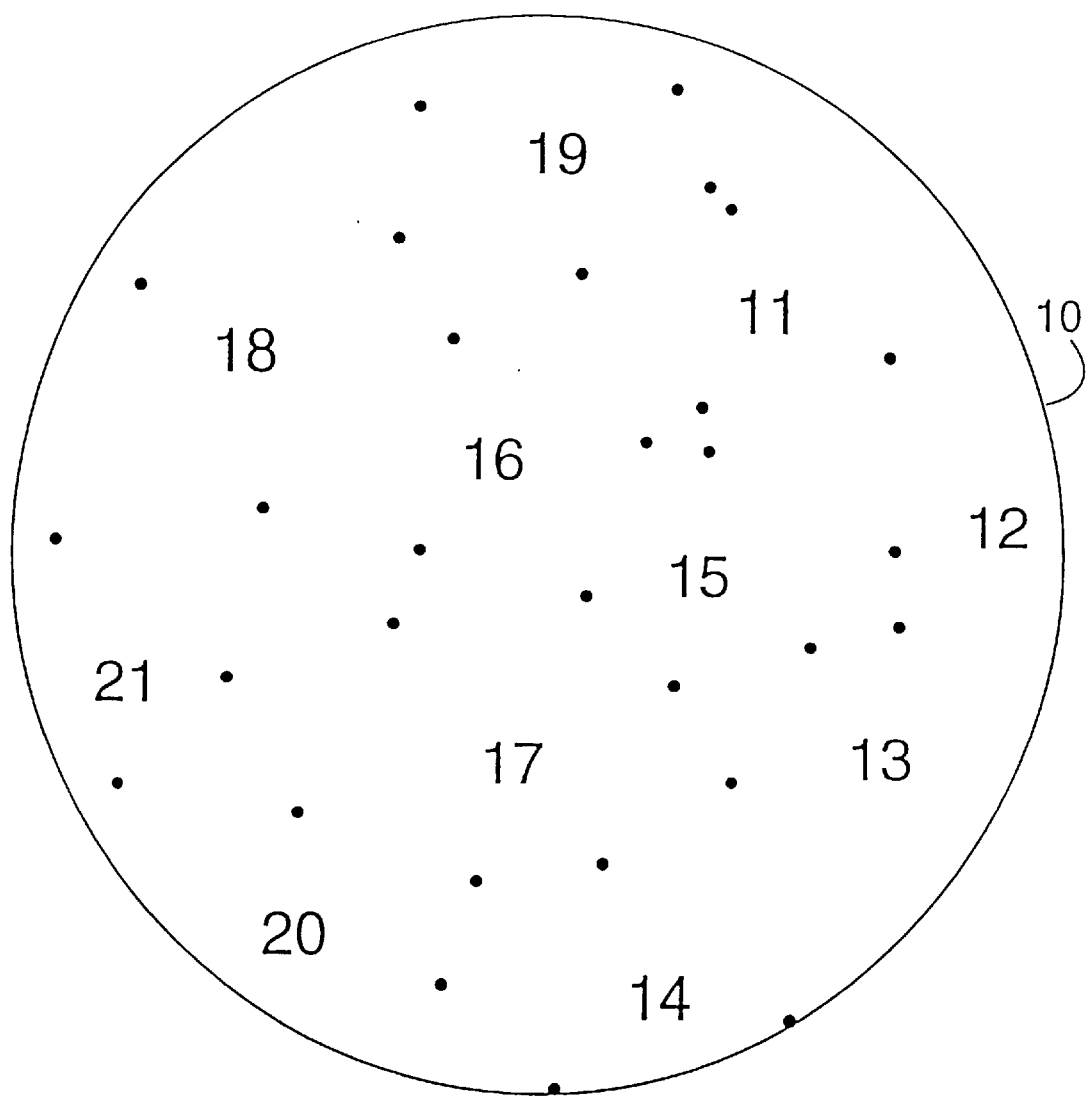
FIG. 2b Depicts an exemplary spherical object containing a pattern of points used for calibration according to the present invention.

FIG. 2*b* depicts the object 10 with a geometric pattern of identified points which are spaced as the vertices of a set of equilateral triangles. A pattern of points such as that shown in FIG. 2*b* can be used for calibration as marked on any geometric object of known form, such as the plane (e.g. object 1) or the sphere (e.g. object 10). FIG. 2*b* shows a set of points marked on the object, where the points correspond to the vertices of the triangles shown in FIG. 2*a*.

In the exemplary embodiment, the sphere can be fashioned from any material which provides a reliable spherical surface. It is noted that there are many products available, such as plastic spheres and balls, even lamp shades, which provide extremely accurate, durable and reliable spherical surfaces for calibration.

B. Scanning System

As the objects 1, 10 mentioned above are used to calibrate a scanning system, an exemplary scanning system is now provided. A scanning system is described in U.S. patent application Ser. No. 08/620,689. That entire application, including its description of the scanning system, has been expressly incorporated herein by reference.

Figure 3:
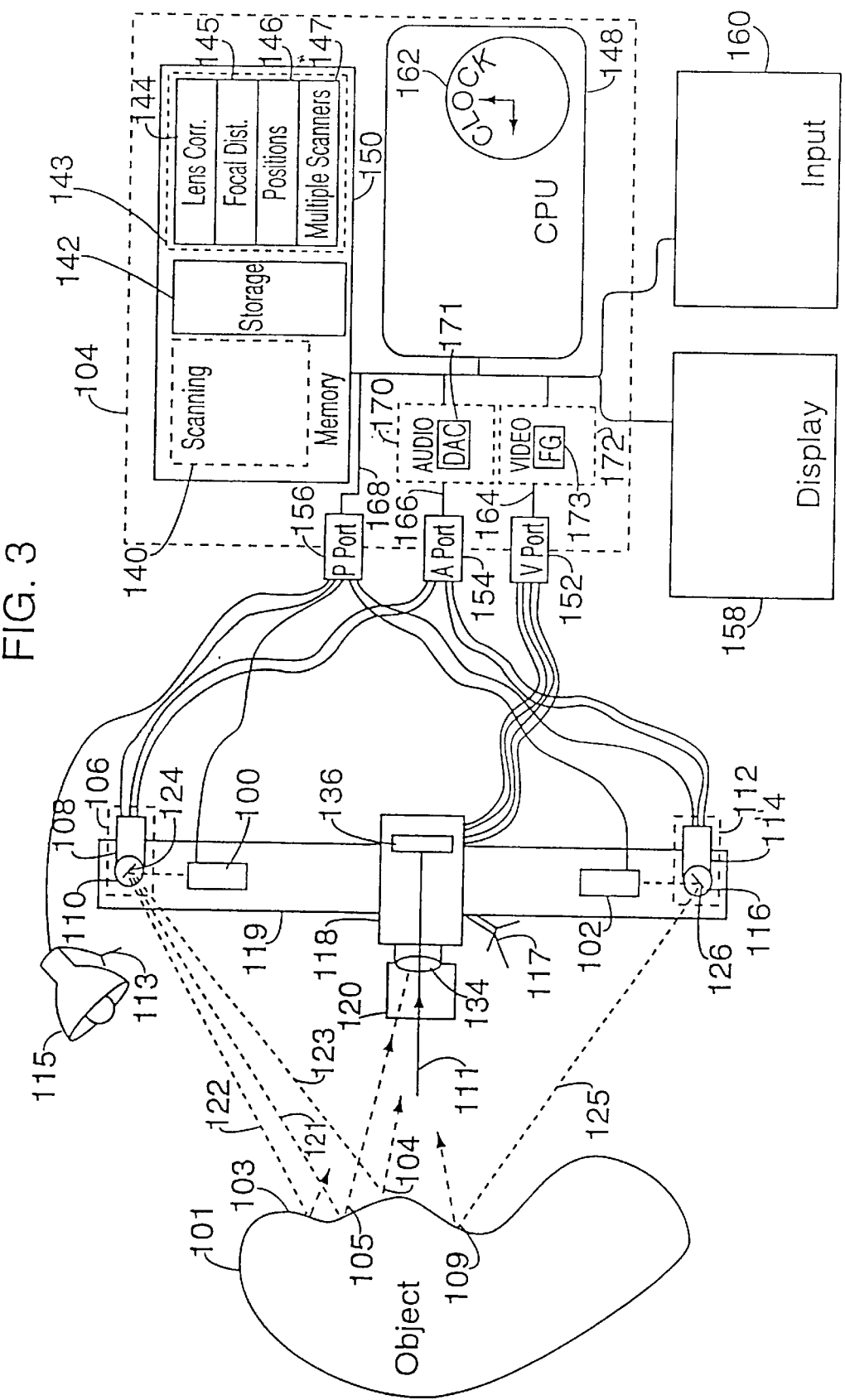
FIG. 3 Depicts an exemplary scanning system to implement the present invention.

FIG. 3 also depicts an exemplary configuration of a scanning system which employs the calibration system and method of the present invention. The system depicted in FIG. 3 is similar to that presented in the above-referenced U.S. patent application. It is noted that the invention can be implemented using many different configurations of equipment and scanning systems, and, as such, the invention is not limited to the embodiment depicted in FIG. 3 or described in the referenced U.S. application. For example, a portable scanning system is described in related U.S. application, entitled "Portable 3-D Scanning System and Method for Rapid Shape Digitizing and Adaptive Mesh Generation" filed on even date herewith and incorporated by reference herein, also describes a system which can be calibrated according to the techniques and devices of the present invention.

Referring to FIG. 3, a light generator 100 is used to create beams of light that are directed toward an object 101 and project a shape of light (such as a laser stripe used to scan the object). In the exemplary embodiment of FIG. 3, the light generator 100 is a diode laser stripe generator, which is a type of laser that outputs a plane of light (each line, e.g., 121, 122, 123, 125 in FIG. 3 describes a top view of a plane of light). When directed toward the object, the plane of light intersects the object 101 in a line that projects as a laser stripe and creates points of reflection, which describe a contour of the object's shape. Diode laser-stripe generators are commercially available and typically comprise a standard diode laser and a single lens attachment to the diode laser.

It is possible to have a configuration of a scanning system that would include more than one light generator per image collector. For example, two or more light generators could be used to scan according to a single-line (one laser stripe for each imaged collected) or a multiple-line method (many laser stripes generated for each image). FIG. 3 depicts such an embodiment, as it shows a second light generator 102, which is also a diode laser stripe generator. In that embodiment, both light generators 100 and 102 would be coupled to and operate in conjunction with a controller 104, such as a computer, to create laser stripes.

In addition to the light generators 100, 102, the system of FIG. 3 also incorporates light positioners 106, 112 to place light plane projections (e.g. 121, 122, 123, 125) and project laser stripes in different locations about the object (e.g. positions 103, 105, 107 and 109). In an exemplary embodiment, the scanning system of the present invention uses a mechanical galvanometric scanner as the light positioner 106. A galvanometric scanner comprises a scanner motor 108 attached to a rotating mirror 110. The mirror turns on the motor's rotation axis. The scanner motor is coupled to and is directed by the controller 104, such as the computer, to rotate the mirror to specific positions at a high rate of speed. The motor uses electrical voltage signals to move and correspondingly position the mirror. By directing the output of the light generator (e.g., 100) towards the mirror 110 of the light positioner 106, the laser light can then be rapidly aimed as a plane of light to different positions on the object 101 to create different laser stripes. The mirror's 110 movement is controlled by different signals of voltages input to the scanner motor 108, each different voltage signal corresponding to a specific laser stripe position assignment.

As laser stripes are projected on the object during the scanning process by either the single or multiple line scanning technique, the present invention provides that an image collector 118 capture images of the data points which reflect from laser stripes and describe the object's shape and contour. In an exemplary embodiment of FIG. 3, the present invention utilizes a charged coupled device (CCD) camera as the image collector 118 to record the data point reflections. In the exemplary embodiment, the image collector 118 (e.g., camera) collects 2D images comprised of pixel intensity readings along an optical axis 111. One standard image is a matrix 640×480 pixels in dimension with each pixel being comprised to register a reading of light intensity. Cameras output the collected image in single frames or in multiple smaller units called fields. Cameras generally output light intensity readings for pixels as analog signals following either the National Television Standards Committee (NTSC) format or the European PAL format. An image "frame" for an NTSC standard camera comprises two interlaced image fields, one field comprising the odd horizontal pixel values of 640×480 matrix (thus, a submatrix of 640× 240 pixel values) and a second field comprising the even horizontal line pixel values (thus, a second submatrix of 640×240 pixel values). One camera suitable for an embodiment of the present invention is a broadcast quality 3-CCD color NTSC camera XC-003 made by Sony.

On some occasions, scanning with laser stripe generation occurs in a dark location or in a location with low light. To collect color and other information concerning an object, it may be necessary to illuminate the object with a light source such as a room light and collect photographic images of the object with no laser scanning. FIG. 3 provides a light source 115, which in the exemplary embodiment is a commercially available room light. The light source is coupled to the controller 104 and the controller 104 is comprised to turn the light source 115 on and off. In addition, the light source could be mounted on a device 113, such as a tripod, or alternatively, it could be attached to the frame 119. Apart from the low light scanning situations, the present invention provides for scanning higher intensity lighting situations by using a daylight filter which is incorporated in the filter 120.

In addition to the hardware elements described above, the scanning system provides a computer configuration comprising a number of hardware and software program elements as the controller 104. The computer processing environment can be any environment that supports asynchronous and synchronous scheduling of processes, such as, for example, the processing of video information by direct memory access (DMA) transfer.

FIG. 3 depicts a computer as the controller 104 comprised of a central processing unit (CPU) 148 which is coupled to a memory 150. The CPU 148 is further coupled to a plurality of ports by a bus architecture, each port being an external connector on the controller 104 and used to couple the controller 104 to peripheral devices, (e.g., the light generators 100, 102, light positioner 106, 112, image collector 118, filter 120, and light source 115). Each port is coupled to the CPU 148 by a plurality of channels 164, 166, 168. In the exemplary embodiment of FIG. 3 there is a first port 152, such as a video port, a second port 154, such as an audio port and a third port 156, such as a parallel port. In addition, the CPU 148 is coupled to a display device 158, such as a monitor, and input devices 160, such as a keyboard and mouse. The CPU 148 functions and controls the connected elements with an operating system (which is incorporated within the CPU 148) and the programmed elements for scanning and calibration described below. The CPU 148 further comprises and is coupled to a clock device 162, which accurately marks time. In an exemplary embodiment, a commercially available computer, such as one of the "PowerPC" brand computers sold by the Apple Computer Company, or a PC using an Intel Pentium™ processor, or a graphics workstation such as the one sold by the Silicon Graphics, Inc. under the trade name "Indy" could be employed as a controller 104 to implement the present invention.

The CPU 148 in the exemplary embodiment is further coupled to an audio controller 170 and video controller 172. As described above, the motor of the galvanometric scanner can be controlled by a set of voltage signals. The CPU 148 generates those voltage signals with an audio board which serves as the audio controller 170. An audio controller board comprises the hardware and programmed elements of a digital-to-analog converter (DAC) 171 that enables digital commands to be output as a set of analog voltage assignments to control the scanner motors (e.g., 108, 114). Audio boards in computers currently available typically have 16-bit digital-to-analog converters, which generally match the precision of the galvanometric scanners used in the exemplary embodiment and thus enable the audio controller board to be used in controlling the galvanometric scanners. In the system depicted in FIG. 3, the right galvanometric scanner is coupled to a right channel of the audio port and the left galvanometric scanner is coupled to a left channel of the audio port (second port 154). As the CPU 148 outputs digital position assignments to direct the positioning of the laser stripes, the audio controller 170 will accept the digital assignment values, convert them to analog signals and output them to the light positioners.

In addition to its coupling to the audio controller 170, the CPU 148 is also coupled to a video controller 172. The video controller 172 comprises a frame grabber 173 which enables the controller 104 to accept collected image of video information and process them. As the image collector 118 outputs frames of data concerning the object 101, the controller 104 must process that information to achieve a data set that can describe the object 101. In an exemplary embodiment, the video controller 172 is coupled to the video port (first port 152). The frame grabber 173 of the video controller 172 augments the video controller 172 with hardware circuitry and program instructions to monitor the channels 164 of the first port 152, such as the video port, and to receive incoming image data signals to arrive in analog (e.g., NTSC) format as either fields or frames of information. The frame grabber 173 processes the video signals and, makes a dedicated analog to digital conversion of the data.

When enabled by the CPU 148, the frame grabber 173 writes the field or frame of information to a designated location (not shown) in memory 150 using, for example, the process of direct memory access (DMA) transfer.

In addition to the control of the light positioners 106, 112 and the image collector 118, FIG. 3 also shows the connections that enable the controller 104 to direct the function of the other hardware components. In an exemplary embodiment, the third port 156 is a parallel port used to provide commands to control functions such as: (a) turning on and off the light generators 100, 102; (b) turning on and off and switching the color filter nodes of the color filter 120; and (c) turning on and off the light source 115 (when necessary to collect color information). For the actuation of the light source, a high-voltage, high-current, solid-state relay is used. An exemplary embodiment parallel port (third port 156) has eight (8) parallel, digital lines, any one of which can be activated by the CPU 148. In controlling the light generators 100, 102, the digital signals are transmitted from the parallel port (third port 156) and received by TTL buffers, amplified by an emitter follower, and subsequently retransmitted to micro-relays which actuate the chosen component.

The present invention provides that the separation between image collector and light positioner can be different depending on the object to be scanned. For example, in an exemplary configuration of a 20 mW diode laser stripe generator, a Cambridge model 6800H galvanometric scanner, and a Sony XC-003 camera, the distance between the camera and the laser source when scanning an object similar in size to a person's head from a location roughly two feet from the object would be in a range from 15 to 40 cm. For other objects that relative distance might change. For accurate scanning, certain values between the light generator, light positioner and image collector must be precisely calibrated. The present invention provides that the position of the scanning equipment be adjustable to allow a change of distance between the image collector and the light positioner for scanning different objects. The image collector 118, light source 115, light generators 100, 102 and light positioners 106, 112 can be mounted on a single frame (such as 119). In the configuration using a frame 119 it is understood that the frame is adjustable so that the relative positions between image collector 118 and the light positioners 106, 112 are adjustable. With each adjustment, the system is recalibrated as described below.

The controller 104 also comprises a set of programmed elements to perform scanning and calibration according to the present invention. In FIG. 3 the memory 150 comprises programmed elements for scanning 140 and a data storage area 142 which enables the controller to collect data according to a single line or multiple line scanning technique and to process the data. Programmed elements for such a system are described in U.S. patent application Ser. No. 08/620,689, which has been expressly incorporated herein by reference. The programmed elements for scanning 140 and the data storage 142 would function as described in that application. FIG. 3 also comprises a set or suite of calibration program elements 143 to determine the initial positions and settings for scanning. In the exemplary embodiment, the calibration program elements include a lens correction procedure 144, a focal point determination procedure 145, a procedure to determine initial settings for the position light positions relative to the image collector, an initial angle of rotation for the light beam 146 and a procedure to calibrate a scanner used in a multiple scanner configurations 147.

C. Triangulation and Parameters for Calibration

Figure 4A:
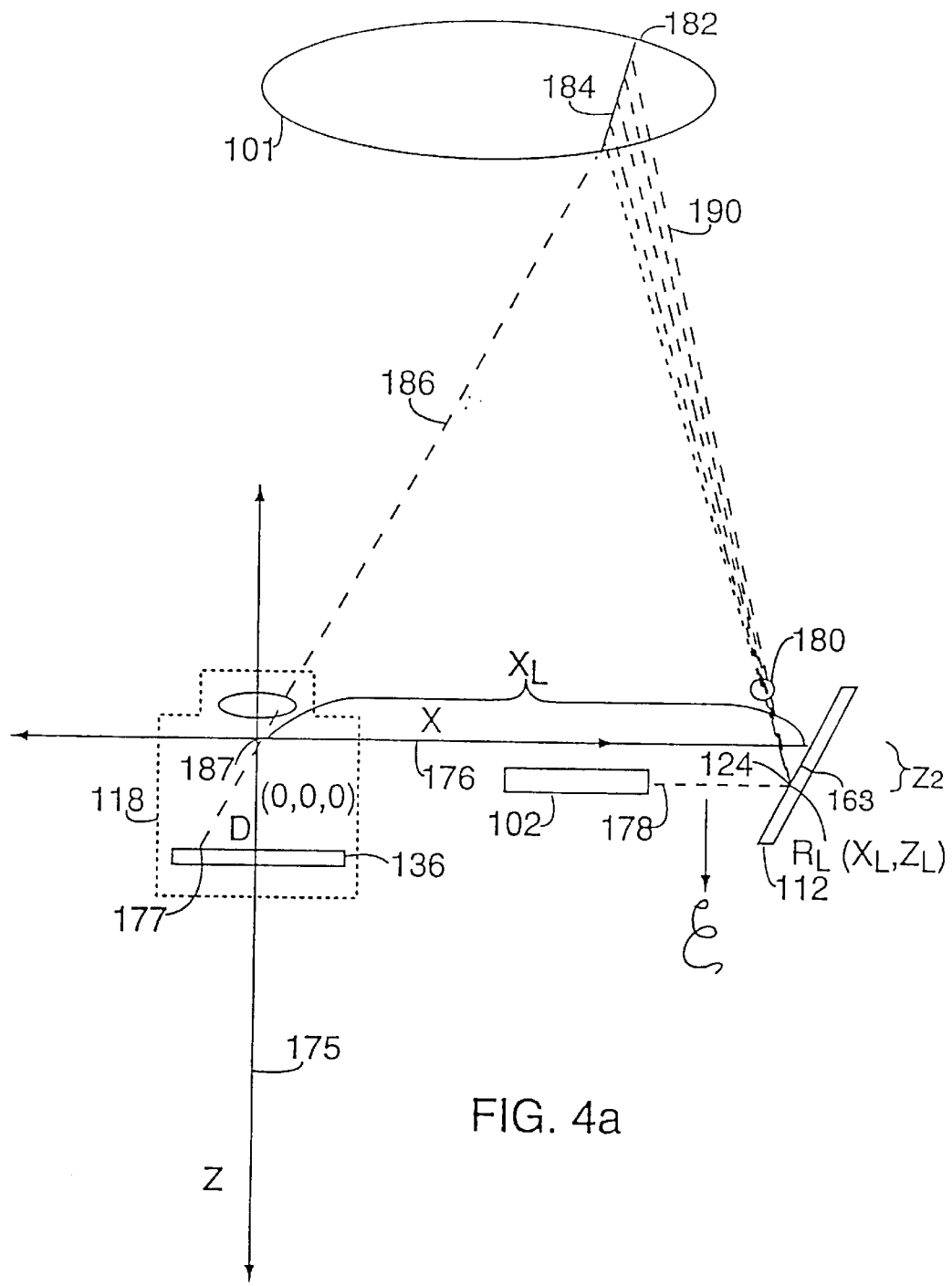
FIG. 4a Depicts an exemplary depiction of the gathering of three dimensional data by triangulation for a point on an object according to the present invention.

As stated above, the present invention scans and collects three dimensional data about the object through a triangulation technique. FIG. 4a provides an exemplary depiction of such data collection by triangulation for point 184 on the object 101. In triangulation, the present invention projects a reflected plane of light 180, comprising beams of light, e.g., 190, toward the object 101. (See also planes 121, 122, 123, 125 in FIG. 3.) The reflected plane of light 180 originates from a light generator such as the light generator 102 from FIG. 3. The light generator 102 emits a plane of light 178 which is directed to the object 101 by a light positioner such as the light positioner 112 from FIG. 3. In the embodiment using a galvanometric scanner, the mirror rotates on the mirror axis 163 and deflects the plane of light 178 toward the object 101. From a point of deflection 124 on the mirror of the light positioner, the reflected light plane 180 travels directly to the object and intersects the object 101 along a laser stripe 182. Light from various points along the laser stripe 182 (such as light ray 186 from point 184) reflects at an angle from the laser stripe position and moves toward an image collector such as the image collector 118 from FIG. 3. The reflected light ray travels through the lens across the focal point 187 and its energy activates one or more pixels at a location 177 on the photocollector (e.g., CCD chip) 136 of the image collector.

Every point (e.g., 184) on the laser stripe 182 which is visible from the camera and at the same time is lighted by the plane of light 180, can be found as an intersection of a plane with the line. The plane of the projected laser stripe (e.g. the reflected plane of light 180) can be described as:

$$\langle n, r \rangle = 1$$

where $n=(n_x, n_y, n_z)$ is a 3D vector that depends on the relative positions of the plane of light 178 as it projects from the light generator 102, and the mirror position as it rotates about the axis 163. r is the position of a point under consideration (e.g., point 184).

The light ray 186 passing through a point on the photocollector 136 (the CCD chip pixel matrix) and focal point 187 of the camera lens is described by an equation:

$$r = \lambda r_0,$$

where $r_0$ is the 3D coordinate of the point where the ray 186 intersects the photocollector in a coordinating system with the origin at the camera lens' focal point, and $\lambda$ is the parameter describing the locus of points on the line extending from the focal point r=0 (point 187) and passing through the point $r=r_0$. As the photocollector 136 outputs each point charged by a light ray as a 2D pixel point value that 2D pixel value can be translated into the 3D coordinate $r_0$ used in the above equation. Solving the above two equations yields:

$$\lambda = \frac{1}{\langle n, r_0 \rangle}$$

so that $$r = \frac{r_0}{\langle n, r_0 \rangle}$$

The value r is the three dimensional (X,Y,Z) coordinate for the point 184 on the object.

The above equations and the techniques of finding the 3D X,Y,Z coordinates based on the intersection of line 186 and reflected plane of light 180 depend on the relative positions of the light plane, light positioner, light generator and image collector. A number of position values must be calibrated with precision to achieve high-accuracy scanning.

i. The Location of the Reflected Plane

There are a set of geometric relationships which describe the reflected plane of light 180 based on the locations of the light generator and mirror in relation to the image collector. As the image collector 118 is located at a distance from the light positioner and light source, it is possible to designate the focal point of the lens (point 187) as the origin (0,0,0) of a coordinate system. A Z axis 175 directs through the origin and runs along the optical axis (or focal axis) of the image collector 118. An X axis 176 directs through the origin, perpendicular to the Z axis on a horizontal plane depicted by the page of the figure drawing. A Y axis (not shown) directs through the origin vertically from and perpendicular to the X and Z axes. The position of the reflected plane of light 180 within this coordinate system depends upon the positions of the generated light and mirror. Within the coordinate system, the plane of light 178 which projects from the light generator 102 to the light positioner 112 can be described in a general equation for a plane:

$$<\xi,r>=d_L$$

where $\xi$ is the normal vector $\xi=(\xi_1, \xi_2, 1)$ to the plane of light 178 and r=(x, y, z) is a point on the plane. $d_L$ is proportional to the distance from the plane to the origin.

This general equation for a plane identifies three unknown parameters based on the location of the plane of light 178: $\xi_1$, $\xi_2$, and $d_L$. Values for these parameters can be found or initialized as part of the calibration procedure. Those methods are described below.

In addition to the plane of light 178, it is also possible to describe generally the position of the mirror of the light positioner 112, which rotates about the mirror axis 163 and moves the laser stripe. The face of the mirror describes a plane. The mirror's axis 163, which moves that mirror plane, can be described by a vector:

$$v=(v_1,1,v_3)$$

In the exemplary embodiment, the mirror axis 163 (the axis is viewed from above in FIG. 4a) is approximately parallel to the Y axis but may not be exactly parallel. Thus, $v_1$ and $v_3$ values are two additional unknown values which can be determined or initialized as part of the calibration procedure, as is described below. Because the location of the mirror plane changes as it rotates about the axis v, it is possible to define the mirror's position with reference to an angle related to the X,Y,Z coordinate system.

Figure 4B:
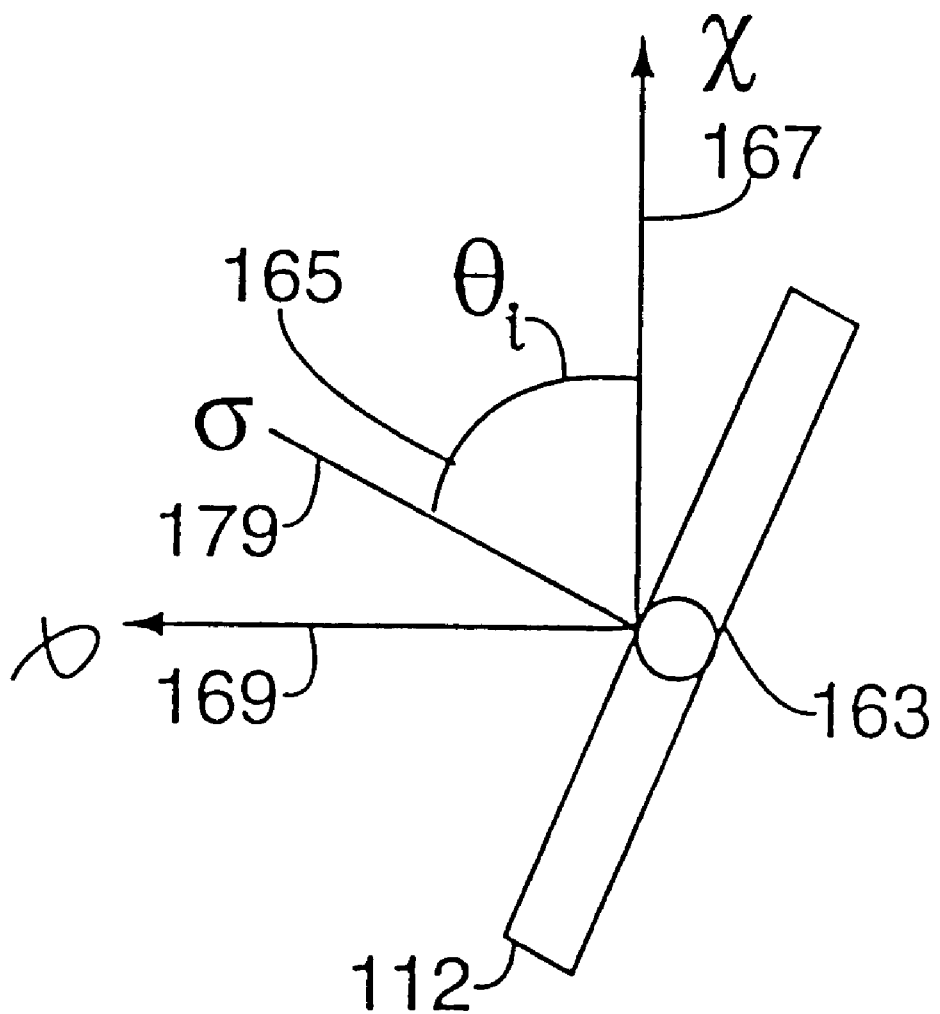
FIG. 4b Depicts a detail of FIG. 4a showing the geometric position of the normal to the mirror.

FIG. 4b shows a detail of the mirror 112 in the given position of FIG. 4a. A normal vector $\sigma$ 179 to the mirror plane and the mirror's axis of rotation 163 are also shown. A set of basis vectors $\chi$ and $\phi$ (167 and 169) can be chosen to express the mirror's normal vector $\sigma$ as a linear combination of the two vectors, $\chi$ and $\phi$. The basis vector $\chi$ is directed along the Z axis and can be defined as a basis vector orthogonal to the X axis with the equation:

$$\chi=(0,\chi_2,-1)$$

where $$<v,\chi>=0$$

and therefore $$\chi_2-v_3=0$$

The basis vector $\phi$ is expressed as:

$$\phi=(-1,\phi_2,\phi_3)$$

where $$<\phi,v>=0$$

and $$<\phi,\chi>=0$$

such that $$-v_1+\phi_2+\phi_3 v_3=0$$

$$\chi_2\phi_2-\phi_3=0$$

$$\phi_2=v_1/(1+v_3\chi_2)$$

$$\phi_3=\chi_{23}\phi_2$$

The angle $\theta_i$ 165 that exists between the normal vector $\sigma$ 179 and the basis vector $\chi$ 167 can be used to describe the position of the mirror plane in any given position as the mirror rotates about the axis, such that:

$$\sigma = \frac{\chi}{\|\chi\|}\cos\theta_i + \frac{\varphi}{\|\varphi\|}\sin\theta_i$$

$\sigma$ can be used to define the mirror plane such that:

$$<\sigma,R_L>=d_m$$

$d_m$ is a measure of the distance of this plane from the origin. The formula measures the point where mirror rotation axis crosses the plane y=0. This point is denoted by $R_L$ and can be determined at a point where the axis crosses the Y axis such that $R_L=(X_L, 0, Z_L)$. As shown in FIG. 4a, $X_L$, $Z_L$ values depict the distance of the mirror axis in relation to the origin. As $X_L$ is a distance determined from the optical axis, it can be determined by measurement and generally need not be calibrated (but can be calibrated if necessary). The $Z_L$ value is calibrated according to the technique of the present invention as described below.

As the mirror rotates about the motor axis, the mirror plane changes locations, which can be determined by a different angle theta ($\theta_i$) value for each position. By determining a precise angle value for an initial mirror position—an initial $\theta_0$ position corresponding to an initial audio signal—every other $\theta_i$ value can be determined with reference to the $\theta_0$ value. In the exemplary embodiment using the galvanometric scanner as a light positioner, the motor rotates according to a set of audio signals. By determining the amount of angular movement of each incremental change in the audio signal, it is possible to express any angle $\theta_i$ value in terms of the initial angle $\theta_0$ (which corresponds to a specific audio signal) and an $\theta_{audio}$ value representing the angular movement existing for a change in the audio signal, such that:

$$\theta_i=\theta_0+\theta_{audio}$$

and $$\theta_{audio}=\tau audio$$

where audio denotes a value of the audio signal measured from the initial audio signal (in an exemplary embodiment the initial audio signal can be identified with a zero value and the other audio signals referenced in relation to that zero value), and $\tau$ is a constant coefficient which is a proportional relationship value showing how the angle value changes per each incremental change in the audio signal (and thus describes how the angle values depend on the audit signal). The calibration procedure described below provides a system and method for calibrating accurate values of $\theta_0$ and $\tau$. The procedure for determining those values is described below.

Figure 4C:
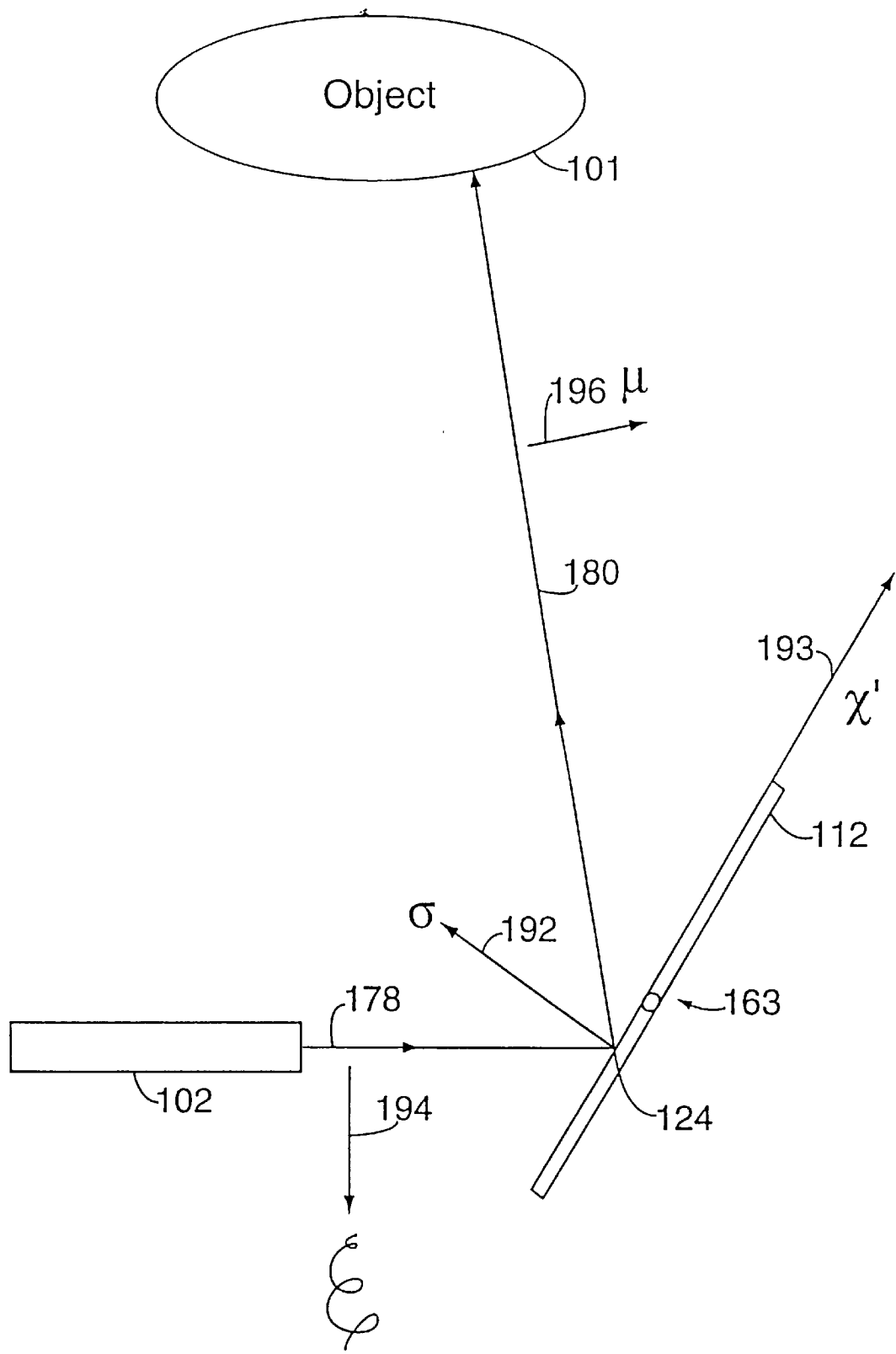
FIG. 4c Depicts a detail of FIG. 4a showing the geometry of an exemplary laser stripe as it deflects to the object.

Having defined the equations to describe the plane of light 178 as it emits from the light source and the mirror plane, it is now possible to define an equation to describe the reflected plane of light 180. FIG. 4c depicts a detail of FIG. 4a and shows the geometric relationships between the light plane and the mirror plane. In FIG. 4c, plane of light 178 emits from the light generator 102 and reflects from the mirror plane 112 at the point of deflection 124. The point of deflection shown in FIG. 4c depicts (from a vertical viewpoint) the location 124 at which the laser plane reflects from the mirror plane 112. That point 124 lies apart and separate from the location of the rotation axis 163. A normal vector σ 192 to the mirror plane directs perpendicular from the point of deflection 124. The normal was determined from the equations above. The normal to the laser plane ξ 194 has also been determined. Using those values, it is possible to calculate the normal vector μ 196, which describes the reflected plane of light 180.

Optical principles hold that as the plane of light 178 deflects from the mirror and becomes the reflected plane of light 180, the angle of incidence equals the angle of reflection. Following that relational principle, the normal vector μ196 can be expressed as follows:

$$\mu = a\sigma + b\chi'$$

$$<\sigma,\xi> = a\sigma - b\chi'$$

$$\mu = 2a\sigma - \xi$$

$$a = <\xi,\sigma>$$

where χ' is a vector which lies on the mirror plane and is the orthogonal to the line formed by the intersection of the plane of light 178 and the mirror plane 112.

In addition, the reflected plane of light 180 can be described by the general equation:

$$<\mu,r> = d_r$$

and as the planes defined by the normal vectors ξ and σ intersect at the point of deflection 124, the line of intersection along that point can be described by the point $R_0 = (X_0, 0, Z_0)$ such that $$<\xi,R_0> = d_L$$

and $$<\sigma,R_0> = d_m$$

Thus, the reflected plane of light 180 is described by the following relationship:

$$d_r = <\mu,R_0> = <2a\sigma - \xi,R_0> = 2ad_m - d_L$$

ii. The Location of the Light Reflecting From Object to Camera

Figure 4D:
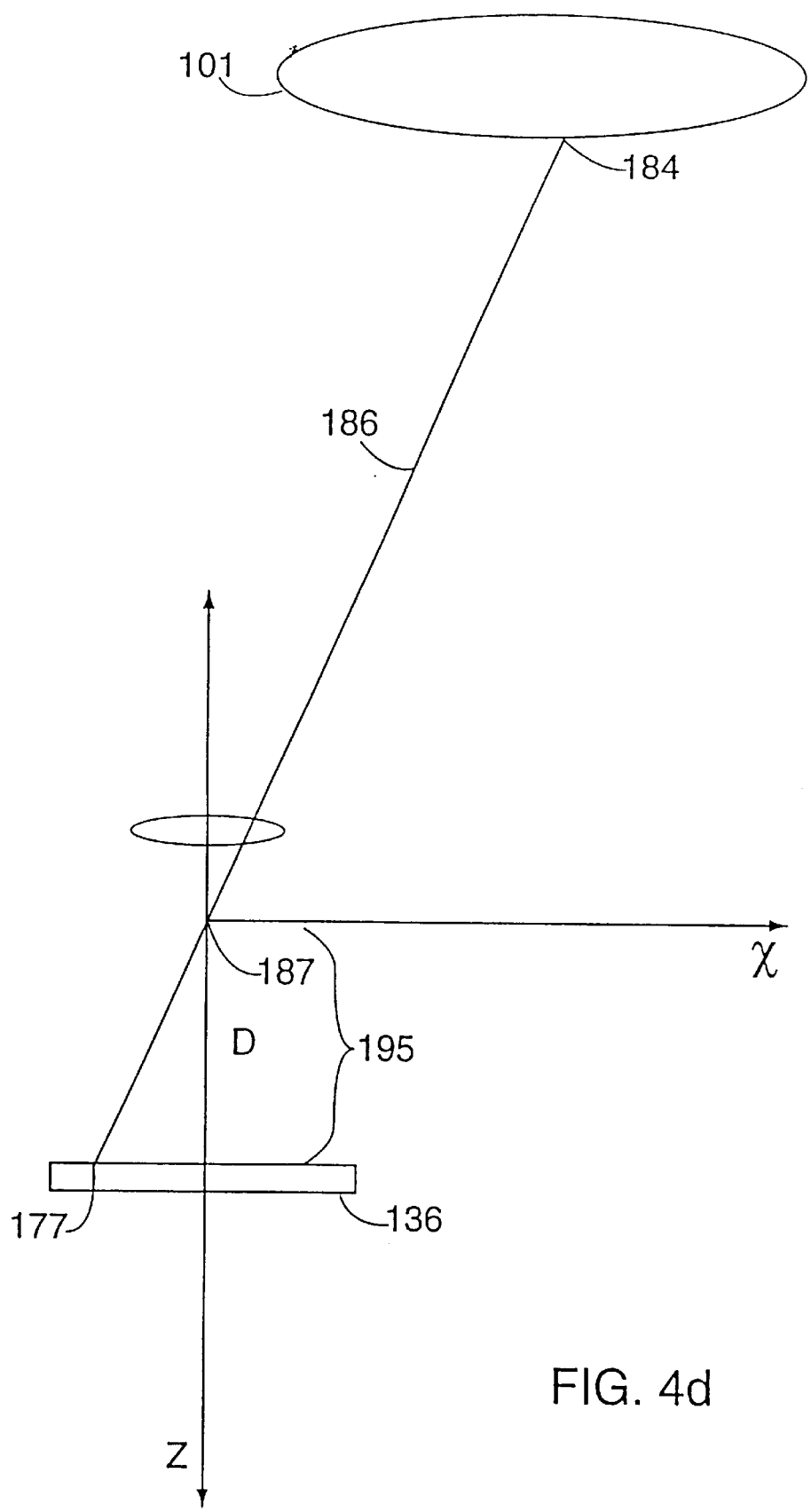
FIG. 4d Depicts a detail of FIG. 4a showing a light ray from a data point on an object as it reflects to the photocollector of the image collector.

As described above, the 3D coordinates of every data point on an object can be determined as the intersection of a plane (e.g., the reflected plane of light 180) and a line (e.g., ray 186). Just as the reflected light plane can be geometrically described, it is also possible to describe the ray of light 186 moving from object to camera for each data point. FIG. 4d depicts a detail of FIG. 4a with light ray 186 traveling from the point on the object 184 toward the camera 118.

The light can be considered as traveling from the lens through the focal point 187 to a 2D light collector 136 inside the camera. The exemplary light collector 136 is comprised of a photocollector, such as a CCD chip, with a two dimensional matrix of pixels (such as a 640×480 matrix described above). The intensities of the reflection of the stripe of light will register in a number of CCD chip pixels (e.g., at location 177), according to the contour shape of the object as described in the reflected data points of the laser stripe.

As stated above, the light ray 186, as it passes through the 2D point location 177 on the photocollector 136 (the CCD chip) and the focal point of the camera lens, is described by the equation $r = \lambda r_0$. $r_0$ is the 3D coordinate of the point 177 using the focal point as the origin of the 3D coordinate system. As the camera outputs point location 177 as a 2D (x,y) pixel or screen point, it is necessary to determine a 3D coordinate for that 2D point output. If the photocollector 136 is located at a distance D along the Z axis from the focal point 186 (which is the origin of the coordinate system), the 3D coordinate for the collected 2D pixel point x,y can be determined using this D value 186. With the D value, the point 177 has a 3D location (x, y, D). By knowing the D value, it is possible to determine $r_0$ and ultimately, r (the 3D X,Y,Z coordinate) for the point on the object. For accurate determinations, it is important to calibrate the D value with high accuracy.

If a typical camera lens system collects the images, the 2D x,y value for the collected pixel data will suffer additionally from the inaccuracies of lens distortion. Typically, the lens will distort more on the outer portions of the image than in the center. Thus, it is advantageous to incorporate some lens correction system within an exemplary calibration procedure to ensure that the 2D (x,y) values are accurate for their use in conjunction with the D value determination.

D. Calibration

Based on the relationships described above, the present invention provides for the setting of initial scanning parameters through a calibration procedure which determines to high accuracy the unknown quantities in the formulas set forth above. At the outset it is possible to set approximate initial values for the parameters. For example, the camera specification for its lens system provides information on the focal point. A well manufactured scanning system employing the exemplary frame 119 can place the camera, laser and galvanometric scanner in positions which provide measurements for the location of the laser and the location of the mirror axis (e.g., the $X_L$ values). The manufacturing process can also ensure that the mirror's axis of rotation runs vertically in line with the Y axis of the coordinate system.

In addition, the initial angle of rotation position ($\theta_0$) and constant coefficient τ can also be determined initially. If an angle α is measured between reflected laser planes corresponding to two different audio signals e.g., $audio_1$ and $audio_2$, then τ can be determined that:

$$\Delta\theta_{audio} = \frac{\alpha}{2}$$

$$\tau = \frac{\Delta\theta_{audio}}{audio_1 - audio_2}$$

If the audio signals, controlling the movement of the motor move from a low to high signal, the τ value can be determined by marking the location of the laser reflected plane corresponding to the lowest audio position, marking the location of the laser reflected plane corresponding to the high end audio signal, measuring the angle formed by the light planes in those positions τ can be determined as described. If a value of τ and a given value of audio measured from the initial audio signal are known then $\theta_{audio}$ can easily be determined:

$$\theta_{audio} = \tau \cdot audio$$

However, τ can be also calibrated as described below. An initial angle position $\theta_0$ can be found by projecting the reflected light plane along an axis that is approximately parallel to the camera's optical axis and marking the initial audio signal for that position (such as by identifying it with a zero value). In the embodiment using the galvanometric scanner, a specific voltage position could be assigned to that initial angle $\theta_0$. However, in scanning, the present invention allows for high precision calibration of the scanning parameters after determination of the initial values, including:

| | |
|---|---|
| • $Z_L$ | The Z location of the axis of rotation for the mirror (with $X_L$ determined by measurement, or optimization if desired) |
| • $\theta_0, \tau$ | An initial angle of rotation for the mirror in an initial position, and the coefficient describing the angular relationship to audio signal change |
| • D value | The focal point location value showing the relationship between the focal point and the photocollector within the camera |
| • Lens correction | Lens correction parameter to offset for lens distortion |

In addition, the mirror axis parameters $v_1$ and $v_3$ can be calibrated by optimization techniques for high accuracy scanning. The present invention provides an exacting process to determine initial parameters and settings in scanning. Although all the parameters can be calibrated in a single fitting procedure, it has been determined that it is possible to achieve better accuracy for the system by isolating unknowns and determining different unknowns in separate procedures. In the calibration procedures described below, the system will calibrate using (1) laser scanned images of objects, such as the objects 1 and 10 above, and/or (2) photographic images taken with no laser scanning.

1. Lens Correction Calibration

One area for calibration corrects for the distortion of the camera lens. As stated above, in scanning systems that employ a camera as an image collector, the typical lens distorts an image in some way, based on the characteristics of the lens. Generally, most camera lenses have a center focal point and axial symmetry. An image distorts typically by curving in some fashion at the outside corners. An example of an actual and distorted image is shown in FIGS. 5a and 5b. FIG. 5a depicts an actual image 502 of parallel vertical lines to be collected by a camera. FIG. 5b depicts the image 504 as it was collected by a camera with its lens distortion. For accurate scanning the distortion characteristic of the lens must be calibrated and corrected.

Figure 6:
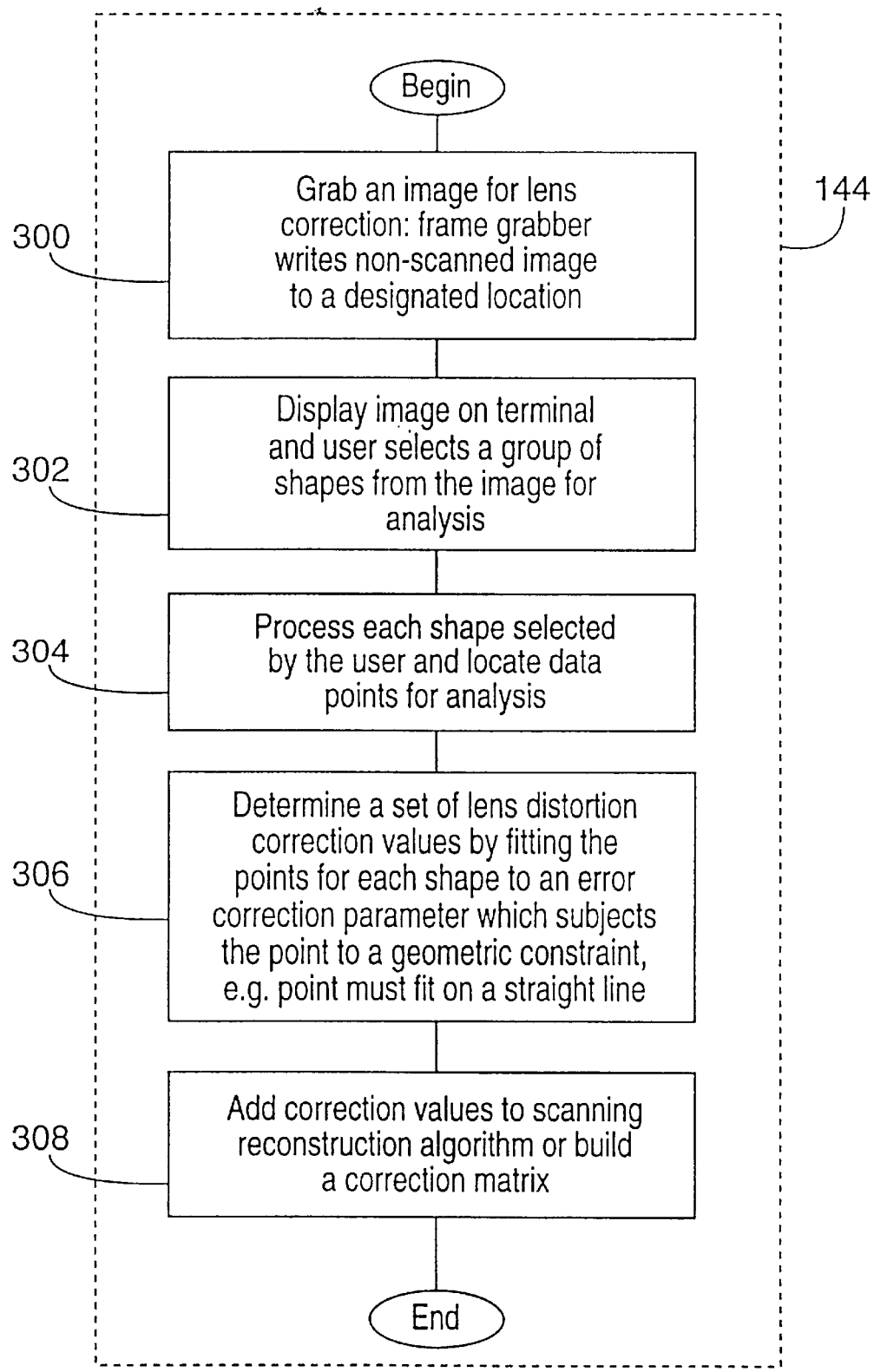
FIG. 6 Depicts an exemplary process flow for a lens correction calibration procedure according to the present invention.

As noted above, a computer controls the scanning system depicted in FIG. 3 and the memory 150 of the controller 104 contains computer instructions grouped in programmed elements to control the system's function. The lens correction process 144 is one programmed element. To perform lens correction, the scanning system takes an image of a geometric pattern, such as the set of parallel lines shown in FIG. 5a. In the exemplary embodiment, the galvanometric scanner can be invoked to output a set of parallel laser lines by programming the mirror to output a repeated and evenly spaced pattern of laser lines (such as in 5a). An image of those lines can be collected by the image collector 118 when they are projected on a surface with a regular geometry, such as a flat wall. Alternatively, a pattern of parallel lines can be printed on a flat card and placed before the camera. With the pattern in view to the camera of the scanning system, the user invokes the lens correction process 144. FIG. 6 depicts an exemplary process flow for that process 144. In step 300, the CPU 148 obtains a photographic image of the geometric pattern by invoking the frame grabber 173 to send an image of the lens calibration scan pattern, in this case a set of vertical lines (without scanning it). The frame grabber, through a DMA transfer process, loads the image into a designated buffer in memory 150 and notifies the CPU 148 of the buffer location. Processing continues in step 302 as the CPU 148 outputs the image to the display device 158. The image will appear distorted, as in FIG. 5b. The programmed instructions then enable the user to select with the input devices 160 a set of lines to analyze. The user selects a number of lines, such as the outer most lines on each side of the image.

In step 304, the CPU 148 invokes a set of program instructions to analyze each pixel of the selected lines areas to locate the pixel points that describe each line. In an exemplary embodiment, the program instructions of step 304 instruct the CPU 148 to progress through the selected areas (row by row) looking at each pixel to determine whether the intensity value matches a certain value, such as a laser intensity value (or alternatively, a color value). When the system finds that a pixel contains relevant line data, it adds the (x,y) pixel value to a data structure allotted for each line. Each pixel point collected has a 2D (x,y) value which corresponds to its position such as on the 640×480 image matrix found in NTSC format cameras. In an alternative embodiment, program module permits the user to select a number of displayed points that evidence the lines (such as by clicking on the points or inputting their screen pixel location values) and these points will be used in analysis.

In step 306, the CPU 148 then optimizes the collected 2D x,y points for each collected line to minimize the curvature of the line image. The general correction calculation is as follows:

$$\rho_{actual} = \rho_0(1+\epsilon(\rho_0)^2),$$

where $\rho_{actual}$ and $\rho_0$ are 2D vectors corresponding to the screen coordinates x and y. $\rho_{actual}$ is the 2D vector for the screen coordinate as it should appear on the image and $\rho_0$ is the 2D vector for the screen coordinate of the pixel as it now appears. Epsilon $\epsilon$ is a parameter which is responsible for and corrects the curvature of the line. For each x,y value, the formula above can also be written:

$$x_{actual} = x_0(1+\epsilon(x_0^2+y_0^2))$$

$$y_{actual} = y_0(1+\epsilon(x_0^2+y_0^2))$$

To fit Epsilon to correct the curvature of the line, the CPU 148 in step 306 invokes programmed elements to perform an analysis, such as regression analysis, standard to mathematics. There are many commercially and publicly available software packages for optimization problems suitable for this computation procedure which can perform regression analysis, such as the software found in the MINPACK, IMSL, NAG and other libraries referenced below. For example, MINPACK is a collection of subroutines written in the FORTRAN programming language to solve numerical systems of nonlinear equations and optimization problems (including the nonlinear least squares problem). It is a general purpose package that can be applied to problems with rather arbitrary smooth functions. Implementation of the computer code for the calibration process involves writing a code for the calculating the error function according to the considered mathematical model and passing this function to a package subroutine to find a solution. When the parameter has been determined, the CPU 148 proceeds in step 308 to store the lens distortion correction parameter in the storage area 142 so that it may be used in the scanning process. In step 308, the CPU 148 can either build a lens correction matrix (which supplies a correction value for each of the 640×480 pixels in an image) or it can save the error correction parameter and calculate each lens correction value at the time of data gathering.

In the exemplary embodiment, using the sample depicted in FIG. 5a, it is not necessary to process every line in the sample, fitting it to a straight line by regression analysis. It is possible to determine accurate values for Epsilon by analyzing one line, and embodiments can be created to examine several lines, such as the outermost lines or a group of inner lines. If the system analyzes more than one line, it is possible to average the found values to arrive at accurate composite values for Epsilon.

2. Focal Point Value Calibration

The present invention also calibrates a value showing the relationship of the focal point and the light collector within the camera. The system provided allows for high precision determination of an initial D value by collecting photographic images of a simple geometric object. At the outset, it is understood that D value can be determined through an optimization procedure or it can be determined as described below. In the first approach, the present invention scans an object of a prescribed form (such as object 1 or object 10) and determines a D value along with the other calibration values as optimal to fit the object, as is described below. In a second approach which provides better accuracy (by finding a D value in a separate procedure), each of the parameters is measured separately. In this section, an application of the second approach to the calibration of the D value is described.

Figure 7A:
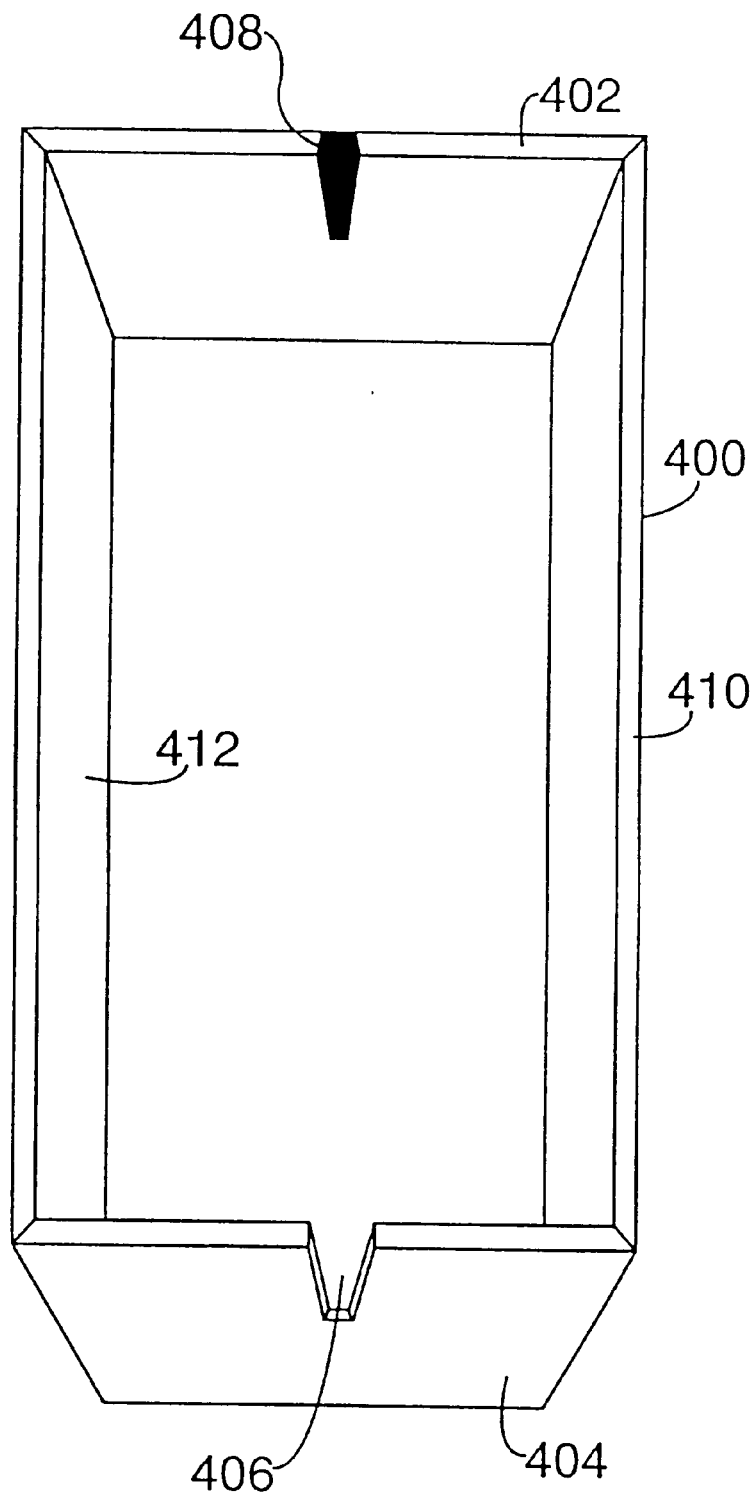
FIG. 7a Depicts a device used to calibrate the relationship between the focal point of a lens and the light/image photocollector in a camera according to the present invention.

To find a D value, the system can use a device with separated, parallel planes, such as the device 400 shown in FIG. 7a. The device 400 comprises the four sides of a rectangular box with known dimensions, such as in the exemplary device depicted, 127 mm on the front 404 and back 402 sides (the separated, parallel planes) and 432 mm on the lateral sides, 410 and 412. On the front 404, there is a rectangular slit 406 in an exemplary embodiment of approximately 1×25 mm to align the box in a position for calibration. The dark mark 408, which is approximately 1×55 mm, can be seen through the slit 406. For example, the slit 406 will be located along the center line of the front 404 and the dark mark 408 will be located along the back 408 in a position such that it can be seen through the slit 406. When the device 400 is placed in view before the camera, the box will be aligned such that an image output by the camera of the device 400 reveals the dark mark 408 through slit 406. The alignment will place the device 400 in a position such that the box will be centered along the optical axis of the camera. Although a rectangular box is the device 400, it is understood that any device having parallel and separate lengths can be used.

Figure 7B:
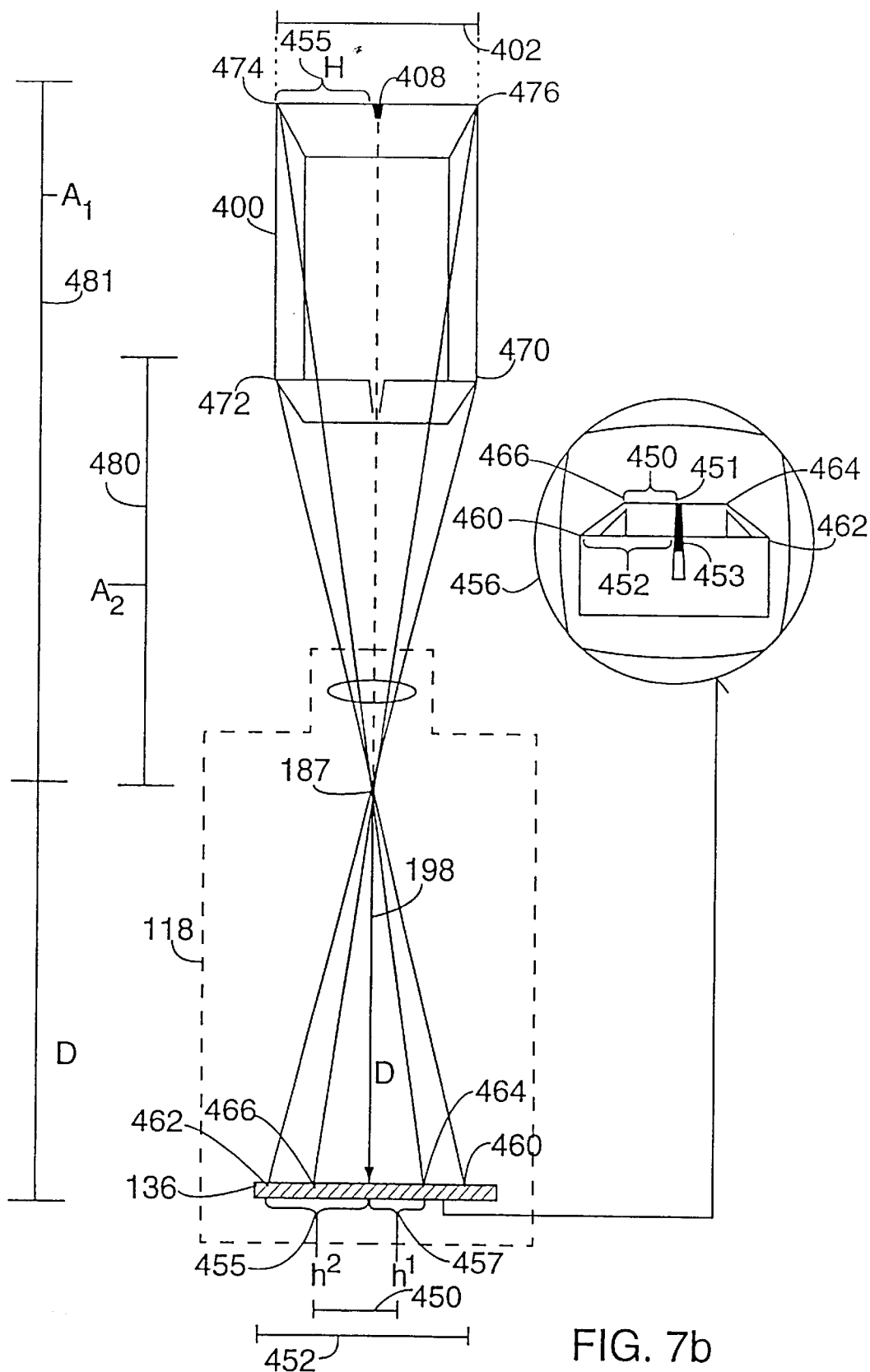
FIG. 7b Depicts the triangular relationship created using the device of FIG. 7a used to calibrate the relationships between the focal point of a lens and the light/image photocollector in a camera according to the present invention.

FIG. 7b depicts a basic structure revealing how a D value is computed from use of the device 400. When the device is placed before the camera at a distance $A_2$ 480 from the focal point in the aligned position (with the back of the box being at distance $A_1$ 481), it creates an image of the device's front 404 and back 402 sides on the photocollector 136 within the camera 118. Display 456 shows the camera's photographic output of the device 400 as aligned. The rays of light making up the image pass through the focal point 187. The distance relationship between the focal point 187 and the photocollector 136 is the D value 198. The photocollector collects an image of pixel points showing the image 456. Within that image, a half-length of the front 404 of the device $F_L$ (length 452) can be compared against a half-length of the back 402 $B_L$ (length 450). As the half-lengths of the front 452 and back 450 are equal in actuality, the system can show their images (with the image of back 450 diminished by perspective) to determine the D value. The light rays reflecting from the device 400 to the photocollector creates similar triangles through the focal point 198. Triangle 187, 466, 464 is similar to triangle 187, 474, 476. Triangle 187, 460, 462 is similar to triangle 187, 472, 470. Within those triangles there are also similar right triangles, such that the known distance H 455 on the device 400 can be compared with the distances within the pixel distances $h_1$ and $h_2$ (455, 457) using the $A_1$ and $A_2$ values (481 and 480). The similar triangles create the following relationships to determine the D value:

$$\frac{H}{A_1} = \frac{h_1}{D_{value}}$$

$$\frac{H}{A_1} = \frac{h_2}{D_{value}}$$

$$D_{value} = \frac{A_1 - A_2 \text{ (length of box)}}{\frac{H}{h_1} - \frac{H}{h_2}}$$

As $h_1$ and $h_2$ can be determined in pixel lengths, the D value can also be determined in pixel lengths. The exemplary embodiment comprises computer software to enable a user to display the image of the box and select on the image the pixel coordinates for the device lengths, such as by clicking with a mouse on these points. In an alternative embodiment, the appropriate points (470,472,474,476) of the box are marked to a specific intensity, such that computer software comprised to locate the points with corresponding intensity values in the image can find the points. A new D value would be calculated when, for example, a new zoom or lens is chosen.

3. Relative Positions of Image Collector and Light Source and Initial Angle of Rotation The present invention also provides a system and method to calibrate settings, such as the relative positions of the image collector and the reflected laser plane ($Z_L$ settings), an initial position value giving the angle of rotation ($\theta_0$) for the laser plane as it moves during scanning to position the light source and τ (the angle/audio parameter). As described above, the triangulation technique used in the scanning system provides that the 3D X, Y, Z coordinates of every point collected by the laser stripe triangulation technique be found as an intersection of a plane and a line. See, FIG. 4a. The plane is the reflected plane of light which creates the laser stripe (e.g., 180, FIG. 4a). The line is the path traveled by the reflected light as it travels from the object to the camera. The reflected plane of light 180 can be described by the equation <n, r>=1 where n=($n_x$, $n_y$, $n_z$) is a 3D vector which depends on the position of the light source relative to the camera ($X_L$, $Z_L$) and the angle of the mirror plane, which, in the case of a scanner with a movable light source, can be based on an initial angle of rotation $\theta_0$ and τ. As the light positioner (e.g., 106, 112, FIG. 3) moves to place the reflected plane of light 180 in different positions, the angle of rotation (e.g., 165, FIG. 4b) can be determined from the positioner's movement from the initial angle of rotation position. The D value, located and determined above, can be used to determine a parameter for the location of the reflected laser plane ($Z_L$), the initial angle of rotation ($\theta_0$) and τ. A set of location values for the object 1 (determined after computing the D value) is also used to calibrate $Z_L$, $\theta_0$ and τ (and other values such as $v_1$ and $v_3$). However, if the D value was not determined in a separate procedure, it can also be determined through the optimization procedure.

To determine the location of the object for calibration, the user places the simple geometric object such as object 1 or object 10 in front of the scanning apparatus in the position of the object 101 in FIG. 3. For purposes of describing an exemplary embodiment, object 1 (the plane containing a set of triangles of FIG. 1) will be used as the object for calibration. However, object 10 (the sphere) or another object of known or determinable geometric form can also be used. The image can be placed in a position, such that it remains stationary during the image collection process. The collection of images for purposes of locating the object involves taking photographic images without scanning. For purposes of collecting images for calibrating values such as the position of camera, light positioner ($Z_L$) and the initial angle of rotation ($\theta_0$) described below, image collection involves scanning the geometric object. Both image collection procedures can be performed in succession and the image collection process takes less than 5 seconds. Thus, the geometric object for scanning could also be positioned by affixing it to a wall or affixing it to a holding device, such as a tripod.

Figure 8:
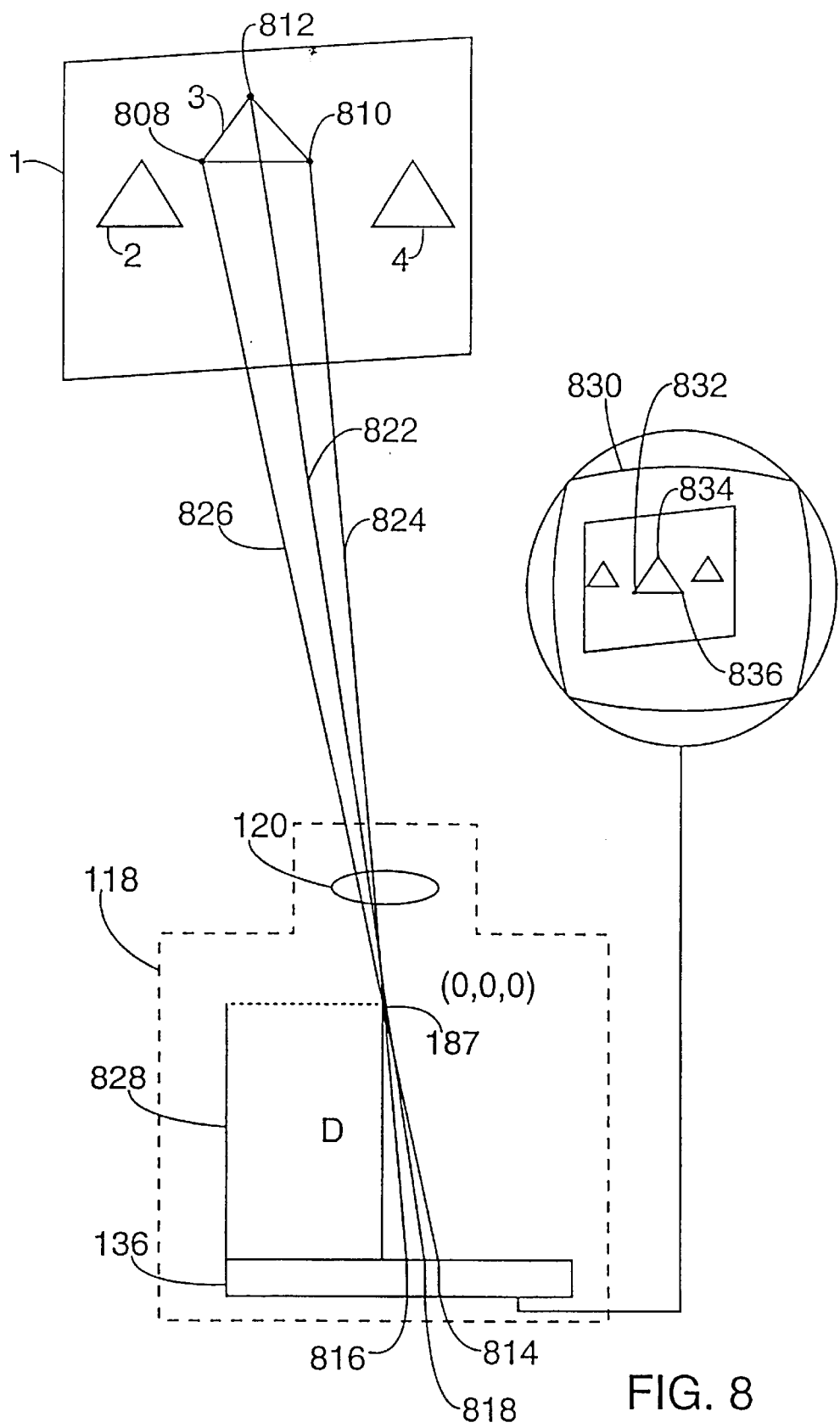
FIG. 8 Depicts an exemplary structure for determining a 3D X, Y, Z location for each vertex of a geometric shape.

FIG. 8 provides a view of the image collector 118 and its lens 120. Within the camera and lens system is a 2D image collection device 136, such as a CCD chip, comprising pixels, such as a 640×480 matrix. The camera is fixed upon and takes images of the object 1 which is output to the controller 104 for further processing to accurately calibrate its location.

Upon the object 1, one of its geometric shapes is addressed. FIG. 8 shows the path of the light rays as they travel from the vertices 808, 810, 812 of the triangle to the image collector 118. For vertex 808 the light will travel on a straight line path from the vertex through the focal point 187 of the lens and its energy will charge one or more pixels at location 814 on the light collection device 136. For vertex 810 the light will travel on a straight line path from the vertex through the focal point 187 of the lens 120 and its energy will charge one or more pixels at location 816 on the image collection device 136. For vertex 812 the light will travel on a straight line path from the vertex through the focal point 187 of the lens 120 and its energy will charge one or more pixels at location 818 on the image collection device 136.

Using optical principles, each light ray r (822,824,826) can be represented by the equation:

$$r = \lambda r_0$$

where $$r_0 = (x, y, D)$$

D is the D value of length 828. The equation describes a ray which passes through the focal point of the lens and intersects the pixel point x, y on the image collection device 136. The equation assumes that the 3D origin (0,0,0) is at the focal point 187. The function:

$$r = \lambda r_0$$

provides the 3D location of each vertex (808,810,812) on the ray defined by the equation $r=\lambda r_0$ above, where $\lambda$ is a scalar value for the ray. The scalar value $\lambda$ depends on object 1's location in space. Thus, the determination of a 3D coordinate for each vertex depends upon two variables: the location of the subject in space and the D value. By setting up an equation for each vertex of the triangle according to formula above and solving the equation for each vertex simultaneously, the present invention obtains a location for the object. To perform the calculations, a user can input an initial D value or retrieve the D value found using the device 400 described above. In solving the equations simultaneously for the three vertices, one constraint is that the X, Y, Z values all must lie on the geometric object. In addition, the second constraint is that the 3D value for the vertices must accurately maintain the known relational distances each vertex has to each other. By solving simultaneously the equation for the vertex locations according to known formulas with those constraints, the system of the present invention can determine a location for object 1.

Figure 9:
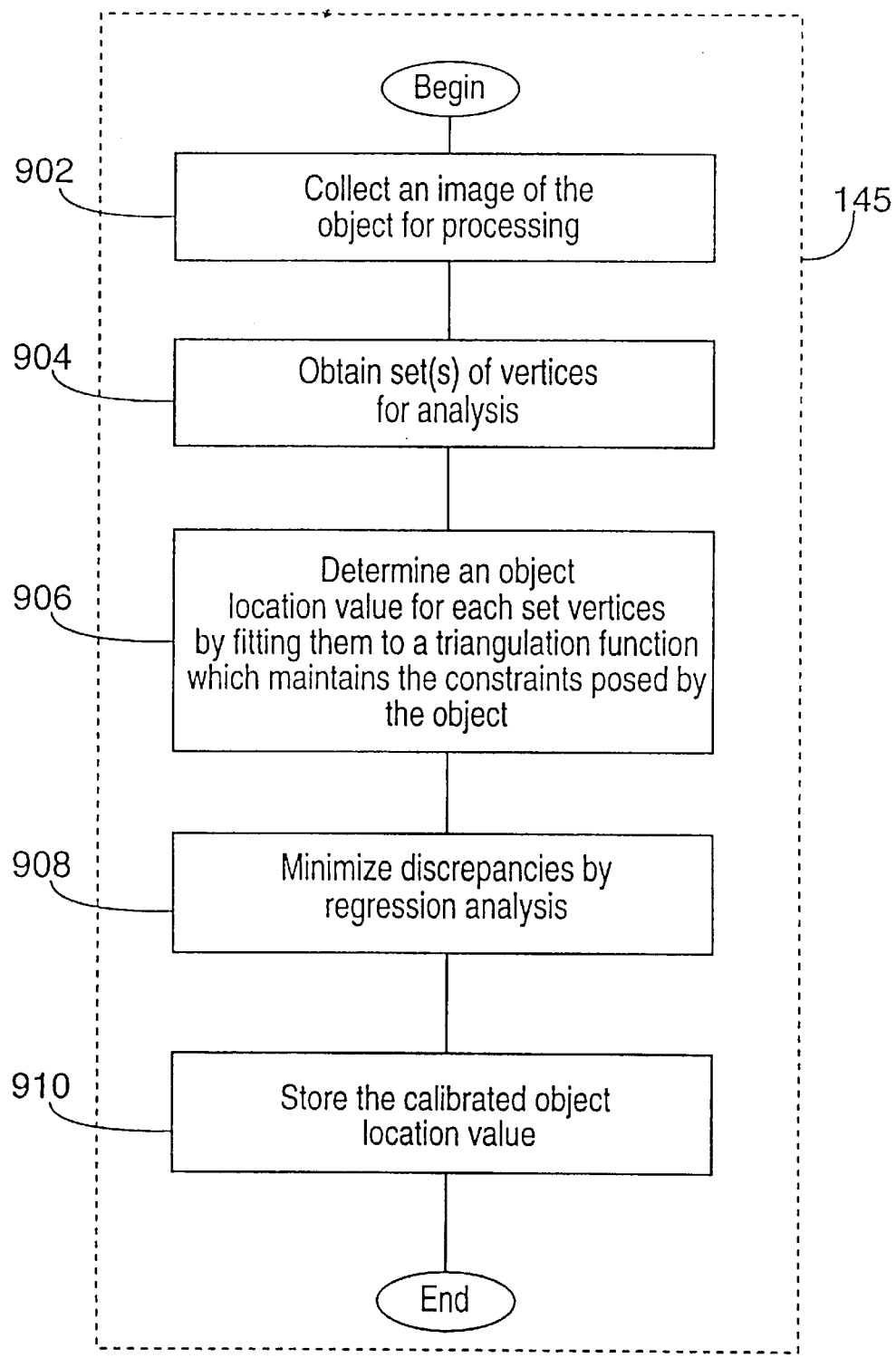
FIG. 9 Depicts an exemplary process flow for a focal point (D value) calibration procedure according to the present invention.

FIG. 9 depicts an exemplary process flow to locate the position of object 1 according to the present invention. In step 902 the CPU 148 invokes the frame grabber 173 to collect an image of the object 1 from the camera. As stated above, it is not necessary to scan the object to collect the three dimensional data for the process of locating the object. A photographic image alone will suffice. The frame grabber 173 receives the photographic image and sends it by DMA transfer to a location in memory 150.

In step 904 the CPU 148 invokes a set of routines to process the image and obtain the sets of vertices which describe each known geometric shape (e.g., 2, 3 and 4). In an exemplary embodiment, the programmed elements of step 904 are comprised to output an image (803, FIG. 8) of the object 1 which reveals the geometric figure in the display device 158. The programmed elements prompt the user to select a set of pixel vertices (e.g., 832, 834, 836), such as by clicking on the screen displayed points. In an alternative exemplary embodiment, the programmed elements of step 904 enable the CPU 148 to process the pixel points of the screen image to read each pixel value from the image collected and identify the 2D screen points (x,y values) which describe the vertices for each geometric object. The vertex locations are stored in a data structure, such as a dynamically allocated array for each geometric shape. Having collected the points, the CPU 148 proceeds to begin a two step procedure to determine the location of the object 1.

The first part of the procedure, step 906, is to determine for each triangle three-dimensional (X, Y, Z) values for the points of its vertices. The programmed elements in this step use a reconstruction technique to create a set of 3D coordinates for each vertex from the two dimensional coordinates found for the vertices of each triangle in the image. One known constraint is that the points of the triangle must lie on object 1 (the plane). Another constraint is that the points must be of the predetermined distance from each other. By knowing the two dimensional pixel point x, y values for a vertex in question and by knowing the constraints above it is possible to fit a three-dimensional location of each vertex such that the object location will be accurately determined.

Referring again to the equations $r_0=(x, y, D)$ and $r=\lambda r_0$ above, the programmed elements of step 906 simultaneously solve these equations for each vertex (e.g., 808, 810, 812) of a triangle on the object 1 using an initial D value (when user input or determined using the device 400 described above). There are a number of both commercial and publicly available software packages for optimization problems which can be used to solve this system of nonlinear equations. Software for optimization in the libraries (referenced below), such as MINPACK, IMSL and NAG are suitable. However, any other method for finding zeroes of nonlinear functions would work as well. The instructions accept as input to the equations data specifying the known shape of the object used for calibration (e.g., object 1 (the plane) or object 10 (the sphere)). For example, in the case of the sphere, a user inputs its radius. In addition, the program instructions incorporate information concerning the relative distances between each vertex of the geometric shapes (e.g., 2, 3, 4) and the D value. By incorporating the constraint information, programmed elements execute to determine for each triangle a location value for the object 1.

Once the controller 104 determines location values for each triangle on object 1, the present invention provides that the controller 104 also compare found location values for each triangle against each other to more accurately determine a composite location of object 1.

Step 908 executes a set of program instructions to compare the found triangles according to the constraints. Generally, for each set of triangle vertices, the values describing the location of the object will be slightly different. For example, in the case of object 1 (the plane), each triangle will have a slightly different value for the plane location. In step 908, the programmed elements fit the previously determined values by standard optimization analysis to minimize the discrepancies. Software for optimization in libraries referenced below such as MINPACK, IMSL and NAG are suitable. In the exemplary embodiment, the plane will be fit so that it passes through all the triangles at the D value found above. In step 910, the CPU 148 stores the values of plane location (the normal vector describing its location) for later use in calibration.

The process for calibration of the $Z_L$, $\theta_0$ and $\tau$ values begins by scanning the object 1 with the light positioner. As described above, when the user placed the object (such as object 1 or 10) before the scanner for calibration of the object's location, the object was also placed for calibration of values such as $Z_L$, $\theta_0$ and $\tau$. It is understood that the data collection processes to gather both the photographic images and the scanned images occurs in a contemporaneous sequence. The total time for collecting both types of images occurs in less than 5 seconds.

The process of scanning the object 1 proceeds as was described in U.S. patent application Ser. No. 08/620,689, which has been expressly incorporated herein by reference. Stated briefly, the light source projects the reflected plane of light 180, comprising beams of light 190–196 against the object 1. (See also 121, 122, 123, 125 in FIG. 3) Such a plane of laser light originates from a light generator, such as the light generator 102 from FIG. 3. The reflected plane of light 180 is directed to the object 101 by a light positioner such as the light positioner 112 from FIG. 3, which, in the case of the galvanometric scanner, deflects the reflected plane of light 180 toward the object 101. From a point of deflection 124, the reflected plane of light 180 travels directly to the object and intersects the object along a laser stripe 182. Light from various points along the laser stripe reflects at an angle from the laser stripe position and moves toward the image collector 118.

The image collector 118 is located at a distance from the point of deflection 124. From that image collector location, the reflected points from the laser stripe describe a shape which reveals a contour of the object (See, e.g., 137). As light beams from the reflected points from the laser stripe travel, their images will be collected through the lens 134 of the image collector 118. The light will then travel to a light collector 136 inside the camera. The exemplary light collector 136 is comprised of a CCD chip photocollector with a two-dimensional matrix of pixels (such as a 640×480 matrix described above). The intensities of the reflection of the stripe of light 122 will register in a number of CCD chip pixels, according to the contour shape of the object as described in the reflected data points of the laser stripe.

Those reflected points are a curvilinear set of points that describe a contour of the object 101 and an image of the reflections as they will be captured in the light collector 136 (e.g., 137). The camera exposes the light collector 136 for a given exposure time and then outputs light intensity value readings for the submatrix field of pixels, odd or even. The image of the laser stripe as it reflects from the surface is output as a number of (x, y) pixel matrix intensity values corresponding to the image of the reflection (e.g., 137).

Referring again to FIG. 3, the controller 104 directs the placement of the laser stripes according to a single line or multiple line scanning technique: in a single line scan, the controller directs the light generator(s) 100 (and/or 102) and the light positioner(s) 106 (and/or 112) such that only one laser stripe is generated per camera image; in a multiple line scan, many laser stripes are generated and their points of reflection captured in a single camera image. For purpose of an exemplary embodiment, the scanning system scans object 1, which is in the same position as it was when the system collected the 2D photographic image for purposes of determining the D value. Scanning the object 1 yields a collection of images containing data points which, by definition, lie on the object. The present invention provides that the process of fitting those points to the object using the determined D value and known location of the object, the present invention determines the values such as $Z_L$, $\theta_0$ and $\tau$.

Figure 10:
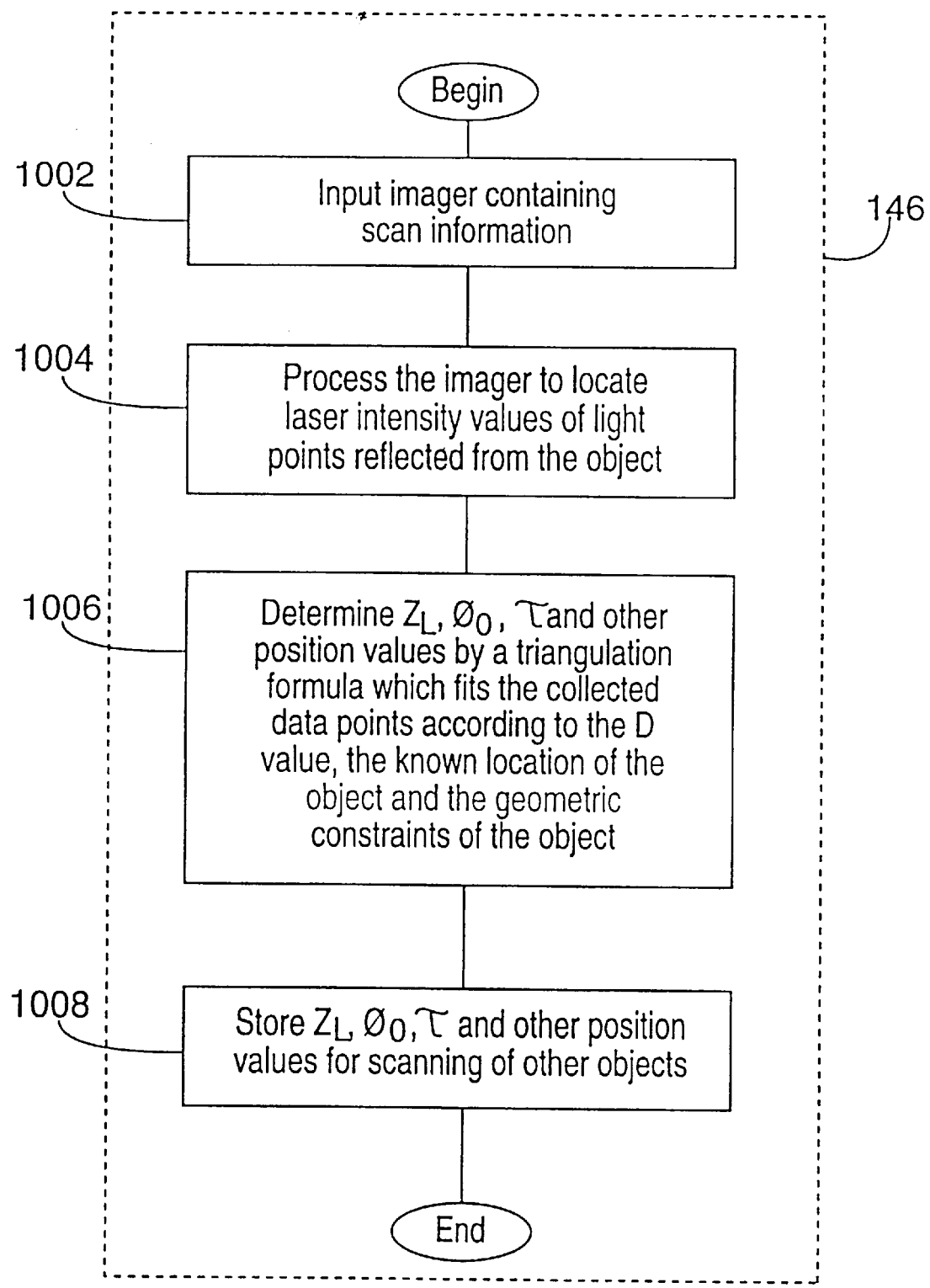
FIG. 10 Depicts a process flow for a procedure to determine the relative positions between the image collector and light source and angle position values according to the present invention.

FIG. 10 depicts an exemplary process flow of calibration process 146 to determine settings for values such as $Z_L$, $\theta_0$ and $\tau$. This process begins in step 1002 as the controller 104 accepts the input images of collected pixel points to amass a set of 3D X, Y, Z coordinates from the 2D x, y pixel values. Such a process was described in U.S. patent application Ser. No. 08/620,689 which has been expressly incorporated herein by reference. In step 1004, CPU 148 of the controller begins processing each collected field or frame of information in memory and locates each set of pixel points containing laser intensity information in that field or frame. For a scanned surface, such as a plane, many pixel values will contain laser information.

As stated, a number of tests can be applied to determine whether a given pi contains laser intensity information, such as, for example, thresholding tests, largest gradient tests, window averaging tests or Gaussian averaging. In an exemplary embodiment, the threshold analysis identifies laser intensity values by comparing a given x, y coordinate to an intensity threshold value. If the coordinate surpasses the threshold, it contains laser information. In addition, for a given x, y pixel coordinate, the threshold values can be set based on corresponding x, y values on an ambient light matrix.

An image of a laser beam can be three or so pixels wide, but the most intense portion of the beam will be located in only a portion of a pixel. In step 1004, the CPU 148 executes a subpixel accuracy function to refine the compressed data points to high accuracy by one of several possible interpolation techniques such as, for example, parabola fitting or a technique to determine the center of mass for the group of pixels, based on the intensity values for each of the neighboring data points found on a given screen line.

After locating the location of the most intense laser image, the CPU 148 returns an x location value for the pixel coordinate for the given y line of pixel output, that x position being computed to subpixel accuracy. The CPU 148 then writes that point to a dynamically allocated storage matrix in one storage array for each camera image (frame or field). In an exemplary embodiment, each storage array is a matrix, y lines long, and in those y values there would be a set of x screen pixel values containing the data points collected by a captured camera frame image. For a single line scan, there will be only one x value per y in the matrix. In the multiple line scanning implementation, there could be many x values associated with a y for a given image.

The CPU 148 writes the computed x location value to the appropriate y line entry for the corresponding camera image.

The process loops and continues processing until all the x values for a given y screen line are processed. Then, the CPU 148 loops to get the next y screen line of information. This process moves by pixel until the CPU 148 processes the entire field or frame of information.

The process of calibration continues in step 1006 with a fitting process to calibrate the $Z_L$, $\theta_0$ and $\tau$ values. In step 1004, the CPU 148 begins the triangulation process by associating laser stripe position assignments to the collected (x, y) pixel points. As stated above, each data point was collected from an image taken when the reflected plane of light 180 was positioned on the object in a specific position. The specific position was determined by a voltage assignment which positioned the galvanometric scanner. In triangulation, an angle position assignment is necessary to generate a three-dimensional X, Y, Z object coordinate for any x, y pixel point. Normally, line position association can be quickly done for a single line scan, because there is only one laser stripe generated per frame. Thus, as each pixel is generated in a given frame (or field), that frame (or field) will have a laser position assignment associated with it. In an embodiment using the galvanometric scanners, that assignment corresponds to a specific angle. For a multiple line scan, the angle position association process is more complex and was described in U.S. patent application Ser. No. 08/620,689.

In the calibration process, the present invention uses x, y pixel points with associated laser positions to compute 3D X, Y, Z point values and calibrate the exact position of $Z_L$, $\theta_0$ and $\tau$. At the outset, $Z_L$ is known to some rough approximation as the user inputs a value for $Z_L$, e.g., 2 cm. As was stated above, all scanning parameters can be determined initially to an approximate value. The calibration procedure will determine the values of these parameters with greater precision.

In addition, the user inputs at the outset an initial value for $\theta_0$, which could be an approximate guess, and an initial $\tau$ value can be input or calculated as described above. The $\theta_0$ angle value corresponds to an initial position assignment for the light positioner (or each light position used with a multiple laser system). In an embodiment using a galvanometric scanner, there is an initial audio-positioning signal which will set the light position to a specific initial position. For example, an initial position could set the reflected plane of light to be directed on an axis that is parallel to the camera's optical axis. In the calibration procedure, before data is collected, the user positions the reflected plane of light to a position that would approximately direct the light plane along such an axis. This audio position value would be associated with that initial angle value. The system determines the light positions for the laser during scanning based on the initial $\theta_0$ value and the incremental scanner movement value $\tau$.

Using the approximate values for $Z_L$, $\theta_0$ $\tau$, the CPU 148 calculates the 3D X, Y, Z coordinates for each collected data point using the triangulation calculations described above. The CPU 148 calculates for each laser position associated with each x, y coordinate an angle position $\theta$ for the given scan line based on the initial $\theta_0$ and the relative movement of the scanner made from the initial position. To calibrate, the CPU 148 now makes a set of triangulation calculations that will fit the values the 3D (X, Y, Z) coordinates defined by triangulation to minimize the error of the initially set parameters $Z_L$, $\theta_0$ and $\tau$. An error function is defined as:

$$F(Z_L, \theta_0, \tau)$$

where the constraint of error function is that the 3D X, Y, Z coordinates must lie on object 1. (In an alternative embodiment the error function can incorporate other parameters, such as $v$, the parameters describing the position in space of the rotation axis, $\xi$, the parameters describing the location of the plane 194, and the D value.) However, in the exemplary embodiment described, the location of object 1 was previously determined with high accuracy using a determined D value. Those other parameters can be initially determined with suitable accuracy without optimization. For the parameters that must be calibrated, the CPU 148 makes the calculations of the 3D X, Y, Z values for each point $r_i$. An error function can be implemented using the sum of squares where:

$$\Sigma(<n, r_i> - 1)^2$$

such that n is a normal vector to the object 1. By performing this calculation for the set of points collected in the scanning, the CPU 148 fits all the points according to the constraint of the object's geometry to determine precise values for $Z_L$, $\theta_0$ and $\tau$ (and others). The vertices of each triangle were determined to fit upon the object 1 (the plane used for calibration). As object 1 is a plane, the equation for its location is:

$$<n, r> = 1$$

where $n=(n_x, n_y, n_z)$ is a normal vector to the object 1 in space and r is a point which lies on object 1. The error function above uses this constraint to find the best fit of $Z_L$, $\theta_0$ and $\tau$ for the collected points (roughly 20,000). In the exemplary embodiment, a software package which will minimize non-linear functions using the least squares method is sufficient to implement the error minimization function used in the present invention. The optimization software found in the MINPACK, IMSL and NAG libraries listed below are suitable for this purpose. In step 1008 of FIG. 10, the CPU 148 writes these optimized values to a location in memory 104. The $Z_L$, $\theta_0$ and $\tau$ values (and the others) are then used in scanning other objects, such as object 101 and enables the device to scan with high accuracy.

4. Multiple Calibration for a System Using Scanning Devices

Figure 11:
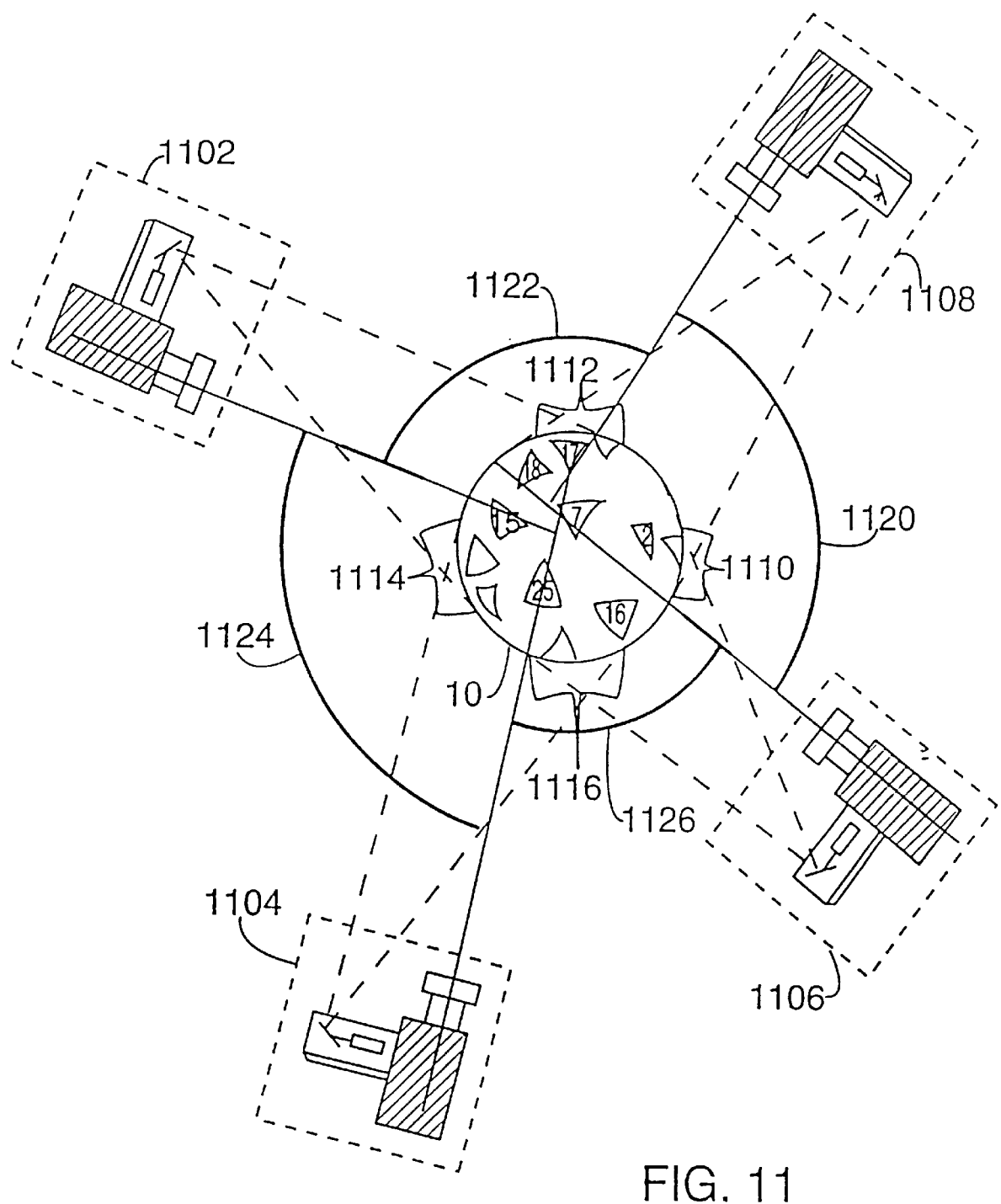
FIG. 11 Depicts an exemplary configuration of multiple scanners to collect a full set of data to describe an object.

FIG. 11 depicts a configuration for calibrating a scanning system with multiple scanners 1102, 1104, 1106 and 1108 using object 10. Although not shown, scanners could also be placed above and below the object 10. Each of the four scanners 1102, 1104, 1106 and 1108 comprises the image collector, light sources and light positioner(s) as the system described by FIG. 3 and as described in U.S. patent application Ser. No. 08/620,689, which has been incorporated by reference. The present invention provides that a geometric object 10, such as a sphere, be used to calibrate relative locations between the scanners 1120, 1122, 1124, 1126. The scanning equipment for each scanner can be coupled to a single computer processor or each scanner can be coupled to its own computer processor as a controller. If many computer processors are used, the data necessary for computing the relative positions between scanners can be downloaded to one designated computer within the system.

To perform calibration in one exemplary embodiment, a user places each camera and laser positioner in a position about the object 10. The user sets the relative distances between the light source and image collector for each scanner and sets an approximate initial angle of rotation. The user inputs this information and inputs initial approximate values $Z_L$, $\theta_0$, $\tau$ (and other parameters) for each scanner into the controller responsible for controlling each scanner. After determining the lens correction parameter and a D value for each scanner as described above, the user sets a geometric object, such as object 10 (the sphere), before the scanners so that it will be in a scanning position for each of the scanners and it will remain stationary for the amount of time it takes to collect images and scan the object.

Figure 12:
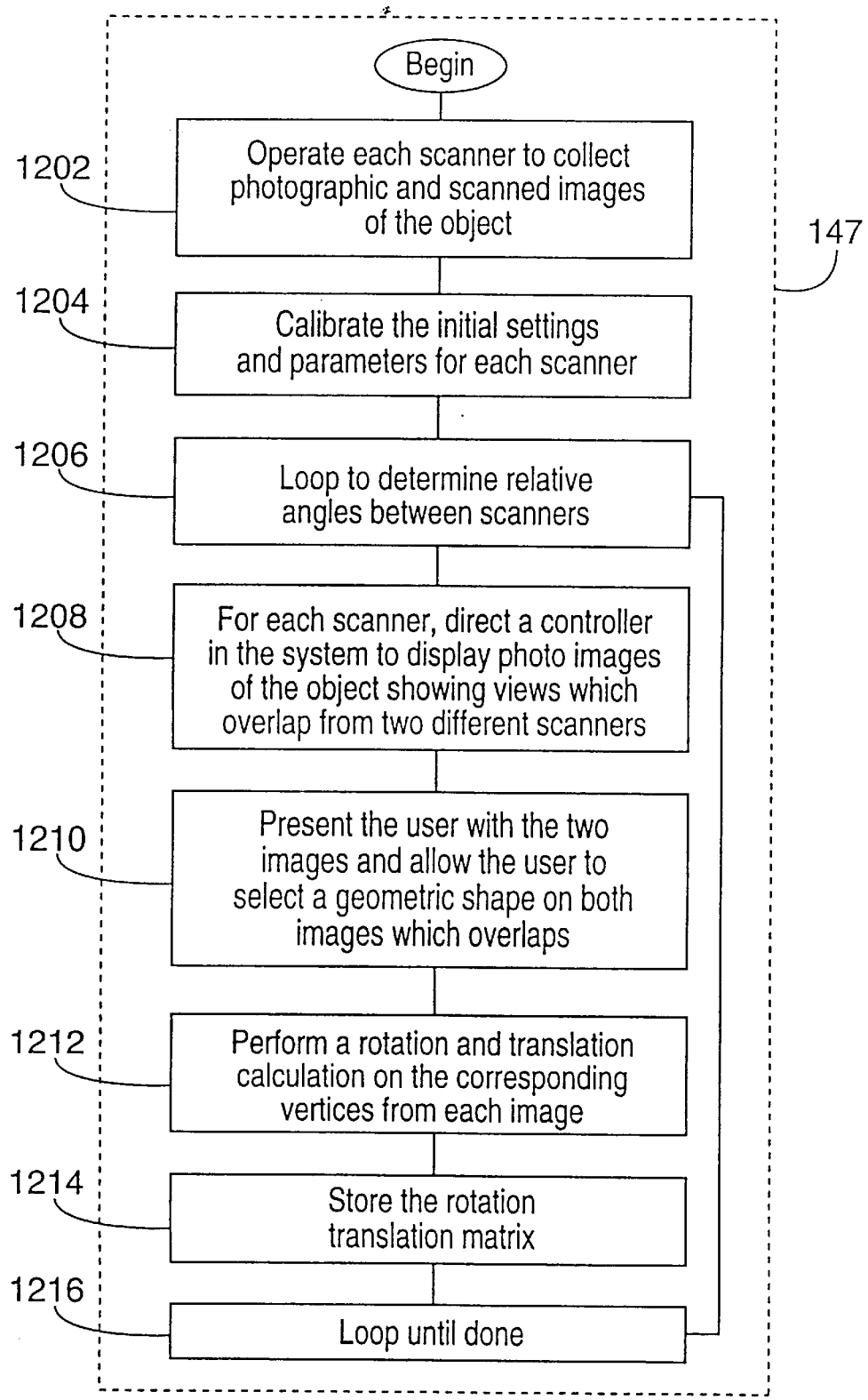
FIG. 12 Depicts an exemplary process flow of a process to calibrate the scanners in a multiple scanner system according to the present invention.

FIG. 12 depicts an exemplary process flow for the process of calibrating a set of scanners as described above. In step 1202, each scanner operates to collect a photo image of the object 10 (this image reveals the geometric shapes on the object) and also to scan the object 10 (which collects three dimensional shape data). In step 1204, the controller for each scanner works for each scanner to locate the position values of the object and then calibrate initial settings (e.g., $Z_L$, $\theta_0$ and $\tau$) based on the images it has collected. Fitting the points to a geometrical object, such as a sphere, is not different in nature than fitting the collected points to a planar object, as described above. Where a plane can be described by the equation $<n, r>=1$, the sphere can be described by the equation:

$$<r-c>^2=\rho^2$$

where c is the location of the center and p is the known radius of the sphere. The geometric shapes, e.g., triangles, can be used to generate the values of $Z_L$, $\theta_0$, and $\tau$ as described above.

In addition, this process of calibration for multiple scanners will yield a determination of the relative positions of each image collector used in the gluing processes. In the gluing procedure, a standard rotation matrix and translation vector are necessary to translate the coordinate values of one set of data points to the coordinate system of another set. As described above, a multiple camera configuration will scan pieces (separate masks) of the object 10 which must be joined to form a unified whole. By putting together the scanned pieces in an organized and unified way, it is possible to create a model which describes the whole object. As each piece was collected from data at different vantage points, each set of points was created according to a different point coordinate system with a different origin. To create the whole object, it is necessary to take each piece and then rotate and translate its coordinates to a single coordinate system with a single origin. To translate the points, it is necessary to determine the relative positions between each image collector.

The present invention provides a system and method for calibrating the relative positions. When all the scanners in the system calibrate using the same object 10 such as the sphere, the images collected to calibrate the initial scanning parameters will also enable a designated controller to determine the relative positions between the cameras for purposes such as gluing.

As stated above, the object 10 used for calibration (the sphere) is covered with a set of geometric patterns, such as a set of triangles. Some of these patterns are visible to several scanners. For example, as each camera in the multiple camera configuration depicted collects images, some of the patterns will overlap and can be visible in the images collected by the different cameras. (FIG. 11 shows overlapping areas 1110, 1112, 1114 and 1116.)

Referring again to FIG. 12, in step 1208 a designated controller receives the images of the triangles from which the location of the object was previously computed for each scanner and the calculated sets of points for the vertices. The points correspond to the vertices of a set of triangles captured in an image taken by each image collector in the multiple image collector configuration. In this processing step, the designated controller in step 1210 presents to the user two images from adjacent cameras on the display 158 and allows the user to select a geometric shape which overlaps in both images. Once the sets of points which overlap are identified from each image (and their 3D values calculated, if necessary), it is possible to determine rotation matrices $R_i$ and translation vectors $t$, for coordinate systems related to each scanner using the error function:

$$F=\Sigma|R_i r+t_i-R_j r'-t_j|^2$$

where the sum is taken for all corresponding points r and r' on i-th and j-th scans and for all scans. If the number of corresponding points is large enough then the minimization problem is well-posed and appropriate mathematical software can be applied. In fact, this problem is a nonlinear least squares problem with unknowns $R_i$ and $t_i$.

The end product for any scanner which is not the designated "origin" scanner is a rotation matrix and a translation vector to translate points between the scanner and designated origin, which can be saved in step 1214 and used later during the gluing process. This process continues to determine a rotation matrix and a translation vector for each of the cameras to move its points to the coordinate system of a designated central camera which contains the origin of the unified coordinate system. In the configuration of FIG. 11, the coordinates of the scanners 1104 and 1108 could be translated and mapped to the coordinate system of scanner 1102 by the overlapping images found between them. The coordinates of the scanner 1106 could be translated to the coordinate system of scanner 1102 by finding an overlap in the images between itself and either scanner 1108 or scanner 1104, and combining the rotation matrix and translation vector for these points with the previously determined rotation matrix and translation vector between scanner 1108 (or 1104) and 1102. The rotation matrices and translation vectors are saved and later used, for example, to glue pieces of other objects later scanned.

5. Calibrating a Portable Scanner

In addition to the scanning system described above, there are also more portable scanning systems which enable the user to collect laser scan data concerning an object with a simple camera and laser light placement device. The portable systems do not employ a controller, such as a computer, during the process of data gathering to control the placement of the laser light shapes. Instead, such systems use a light positioner and image collector to gather data and collect images of scanned data which are saved on storage media (such as in camcorder memory or on a tape) and later processed using a controller to process the images containing the data. A portable scanning system is described in the United States patent application entitled, "Portable 3-D Scanning System and Method for Rapid Shape Digitizing and Adaptive Mesh Generation" and filed on even date herewith. That application has been expressly incorporated herein by reference. The portable system described uses a laser light positioning device that sweeps a laser stripe across the object at some determinable and constant rate and also outputs signals that can be recorded and used to determine the position of the laser stripe in any position as it sweeps across the object. An image collector, such as a video camera, collects images of the object as the sweeping laser stripe scans it. The signals to indicate the position of the laser light stripe are synchronized with the captured images by a technique, such as by storing the signals as audio signals on the audio track that runs parallel with the video image recording of any video camera. Later, the picture and audio data collected is fed into a computer and processed. For such a portable system, a user must accurately calibrate the initial settings and parameters in the same manner as the less portable scanners above.

Figure 13:
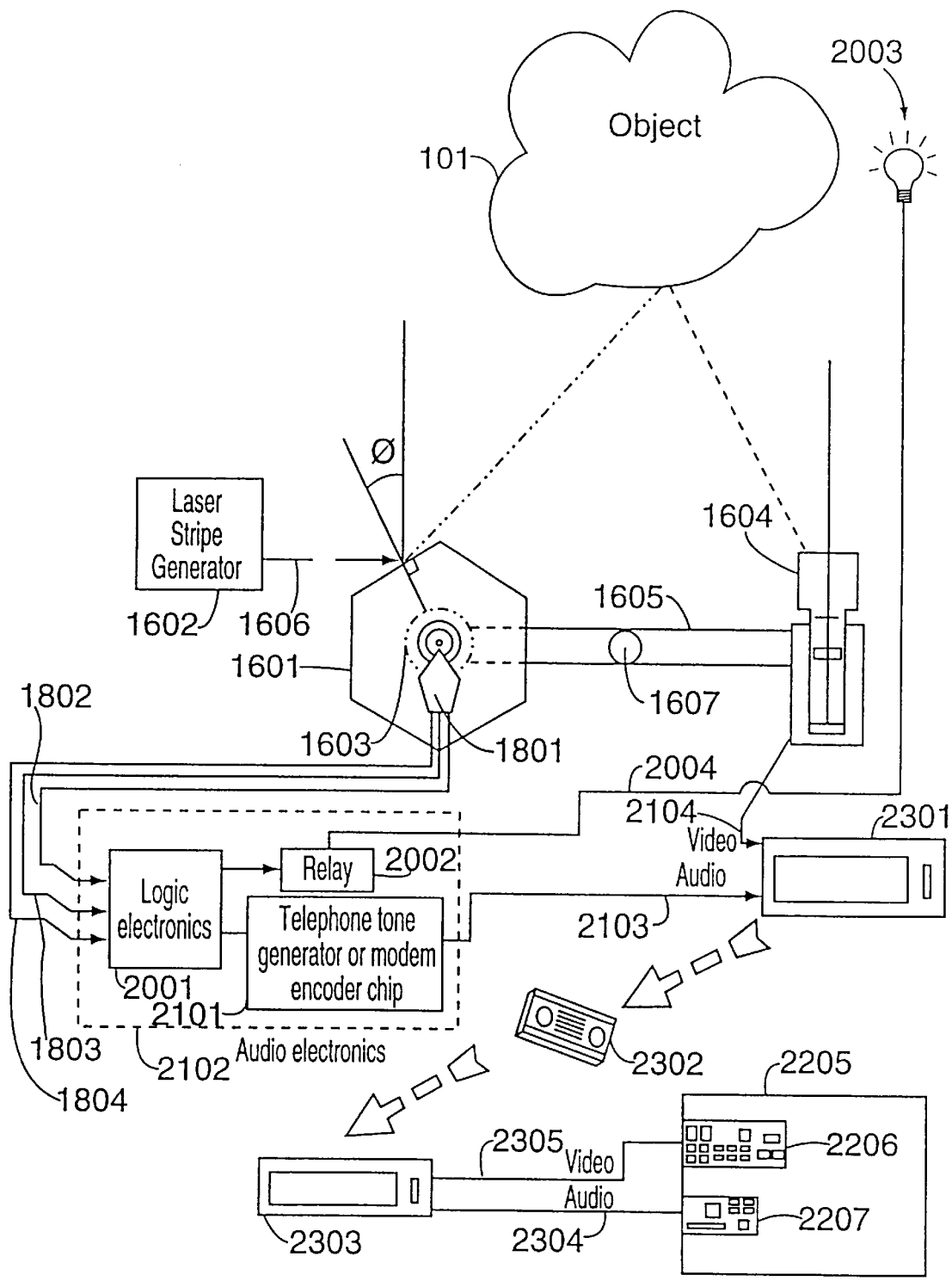
FIG. 13 Depicts an exemplary configuration of a portable scanning system.

FIG. 13 depicts a portable scanning system similar to that disclosed in the referenced patent application. As shown in FIG. 13, a basic embodiment of a portable scanning system for calibration according to the present invention includes a laser-stripe generator 1602, a video camera 1604, a continuously spinning motor 1603 and a set of scanning mirrors 1601 attached to the continuously spinning motor 1603. The rotating scanning mirrors reflect the laser stripe 1606 and variably position the laser stripe across a target object 101. The video camera 1604, which is positioned relative to the target object 101 at a distance which allows for triangulation calculations (following that described above), detects light from the laser stripe reflected from the object and records a sequence of image frames each containing an image of the reflected laser-stripe. The combination of the scanning mirrors 1601 attached to the continuously spinning motor 1603, the laser-stripe generator 1602, and the video camera 1604 are preferably mounted on a mechanical arm 1605. The mechanical arm 1605, which allows the triangulation distance between the scanning mirror 1601 and the video camera 1604 to be varied by manipulation of the adjustment mechanism 1607, may be in turn mounted on a standard camera tripod, which is not shown.

In the embodiment illustrated in FIG. 13, the motor 1603 may be a simple DC/AC motor with a gear head. The motor 1603 rotates at a constant speed in the range of 2–4 revolutions per minute (rpm), for example. The angular velocity of the motor 1603 may be adjusted for varying levels of scanning quality and scanning time. High stability of rotation speed of the motor is not required for the portable scanning system according to the present invention. Because virtually no load is applied to the motor 1603, the motor may be a miniature motor.

The mirror 1601 shown in FIG. 13 is a polygonal mirror which has, for example, six symmetrical facets. For each degree of angular movement of the motor 1603, the laser stripe 1606 sweeps two degrees of field of view of the video camera 1604. Accordingly, each of the six facets of the mirror 1601 sweeps 120 degrees ((360 degrees/6)×2)=120 degrees) of field of view during each rotation of the motor 1603. The mirror 1601 may alternatively have 7–12 symmetrical facets. If the mirror 1601 has, for example, eight facets, each facet will sweep 90 degrees ((360 degrees/8) ×2=90 degrees) of field of view during each rotation of the motor 1603. Since a typical video camera has a maximum field of view of about 60 degrees, the whole field of view of the video camera will be covered by a sweep of each facet of the mirror as long as the polygonal mirror has 12 or fewer facets.

The video camera 1604 may be any one of the commercially available video cameras as long as the chosen video camera outputs high-resolution, real-time video signals. A typical commercially available video camera which is exemplary has a resolution of 640×480 pixels per image frame and an operating speed of 30 image frames per second, which is equivalent to 60 image fields per second. Furthermore, a typical commercially available video camcorder, which combines a video camera with a recording mechanism, is adapted to record the video signals on a storage medium such as a video cassette tape.

If the angular velocity of the motor is 4 rpm, for example, and the scanned object corresponds to 30 degrees within the field of view of the camera, then each of the six facets of the mirror 1601 will sweep a 30 degree field of view in (30 degrees/2)×(60 seconds/(4×360 degrees))=0.625 seconds. In this case, the time required to scan the object will be a function of the desired number of scan lines. If, on the other hand, the motor 1603 has an angular velocity of 2 rpm and 60 laser stripe images are desired for scanning an object which corresponds to 30 degrees within the field of view of the camera, the video camera 1604 will record 60 image fields in 1 second, but the scanning mirror will sweep across only (30 degrees/1.25 second)×(1 second)=24 degrees in 1 second. In this case, the time for scanning the entire object will be dependent on the time required for the mirror to sweep 30 degrees in the camera's field of view.

As the mirror rotates, the portable scanning system depicted in FIG. 13 provides an optical encoder 1801 to output signals which identify each position of the motor 1603 as it turns. The optical encoder 1801 includes a disk ("code wheel") with holes which is attached to the shaft of the motor 1603, one or more light emitting diodes (LEDs), a set of photodetectors and a signal-processing circuit. As the disk rotates with the shaft of the motor 1603, light emitted from the set of LEDs travels through the holes in the disk and is detected by the photodetectors. The signals from the photodetectors are processed by the signal-processing circuit, and the resulting output signals indicating the motor 1603 are produced on channels 1802 and 1803, for example. The output signals on channels 1802 and 1803 are square waveforms representing binary numbers; the output signal on channel 1802 is 90 degrees out of phase with the output signal on channel 1803.

Exemplary, low-cost optical encoders which may be incorporated in the exemplary embodiment are HEDS/HEDM series of optical encoders made by Hewlett-Packard Co. These encoders provide 360–1024 counts per revolution, as reflected by output signals on the channels 1802 and 1803. HEDS-5540/5640 encoders generate three-channel, digital output, with the output signal on channel 1804 being an index pulse which is generated once for each full rotation of the motor 1603. The output signals on channels 1802–1804 may be recorded on a recording medium or fed directly to a computer. By interpolating between adjacent, recorded counts, the computer can assign a specific signal to every position of the motor 1603 with high precision. Using this position assignment, the system can calibrate the mirror to find specific angle positions of the laser light as it projects on the object.

FIG. 13 shows further how the system records the angular positions of the motor 1603, preferably in audio format. As stated above, the portable system depicted scans by projecting the laser stripe 1606 constantly against a polygonal mirror 1601 which rotates according to the speed of the motor 1603. Each facet of the mirror will project a sweeping laser stripe against the object. As the bands sweep across the object, the camera 1604 collects images; a freeze-frame image of the sweeping band. To determine the 3D X,Y,Z values for the data points captured within that frame, it is necessary to know an angle value for the laser stripe at the particular instant it is captured in the collected camera image. Because the motor outputs a signal for each unique position as it rotates and the signal can be calibrated to a mirror angle, it is possible to triangulate 3D data points for each collected image assigning a motor rotational signal to each collected image.

The exemplary embodiment of FIG. 13 includes an audio-signal generator 2101. The position signals of the motor 1603 may be encoded into audio type electrical signals by the audio-signal generator 2101, which may be a telephone tone generator or a modem encoder chip. For example, the telephone tone generator used in modern touch-tone telephones generates audio type electrical signals by mixing two electrical signals of different frequencies. The bandwidth of the resultant signal falls well within the telephone signal bandwidth of 4 kHz.

As shown in FIG. 13, the logic electronics 2001 trigger the telephone tone generator or the modem encoder chip 2101 in response to the output of the optical encoder 1801 transmitted via output channels 1802–1804, such that every count generated by the optical encoder 1801 is represented by a sequence of telephone tone pulses. The logic electronics 2001 and the telephone tone generator (or the modem encoder chip) 2101 may be viewed as components of audio electronics 2102. The logic electronics 2001 include a quartz generator for triggering the tone generator or the modem encoder chip 2101. (Optionally, the logic electronics 2001 can include a procedure for illuminating the object 101 during certain calibration procedures with a light source 2003 using a relay 2002. The illumination is useful for gathering color and texture information and photographic images apart from scanning.) Assuming the optical encoder 1801 generates 360 counts per revolution, for example, the modem encoder chip 2101 needs to encode 360 different numbers, which means using as many as three bits of the modem encoder chip 2101. The quartz generator provides a timing signal for the multiple bits of the modem encoder chip 2101. Assuming the motor 1603 has an angular velocity of 2–4 rpm and the optical encoder 1801 generates 360 counts per revolution, any commonly used telephone tone generator will be sufficient for the purposes of encoding angular positions of the motor 1603.

The video image frames from the video camera 1604 and the audio signals from the audio electronics 2102 may be fed directly to a computer not shown in FIG. 13, or recorded on a storage medium and processed later by a computer 2205, as shown in FIG. 13. To store directly the signals on a computer as mentioned (but not shown), the video signals representing the captured image frames are fed from the video camera 1604 via channel 2104 to a video capture device of the computer. Similarly, the audio signals representing the angular positions of the motor 1603 are fed from the audio electronics 2102 via channel 2103 to an audio capture device of the computer. For a PC type computer, the video capture device is a plug-in frame grabber board, while the audio capture device is an input terminal of a sound board.

For the configuration in FIG. 13 using the remote computer 2205, video image frames from the camera 1604 and audio signals representing the angular positions of the motor 1603 may be recorded on a storage medium 2302 by means of a recording device 2301. In FIG. 13, the storage medium 2302 is, for example, at least one cassette tape for recording both video and audio signals. A typical camcorder, which is designed to record both video and audio signals, combines the video camera 1604 and the recording device 2301 (hence, the video output channel 2104 to the recording device occurs within the camera). For example, camcorders manufactured by Sony have an audio input for recording audio signals from an auxiliary microphone. The audio input can be used to record audio signals generated by the audio electronics 2102. The video and audio signals recorded on the storage medium 2302 may be reproduced by means of a VCR 2303, for example, and fed (via output channel 2305) to the video capture device 2206 and (via output channel 2304) to the audio capture device 2207, respectively, of the computer 2205. The computer then performs the triangulation calculation and determines the 3D coordinates representing the profile of the scanned object, as well as performing other post-scanning tasks, e.g., data simplification and adaptive-mesh generation.

It should be emphasized that, for each embodiment illustrated in FIG. 13, video image frames containing the images of laser stripes reflected from the scanned object and signals representing the angular positions of the motor 1603 may be recorded on an intermediate storage medium. By utilizing the intermediate storage medium, the exemplary embodiments of the scanning system, according to the present invention shown in FIG. 13, eliminate the need to have a computer present at the scanning site, thereby achieving practical portability and added flexibility in scanning. For the exemplary embodiments of the portable scanning system according to the present invention, the computer is a device used to process the data obtained from the scanning process: the computer need not participate in the data acquisition process. At the scanning site, without the computer, the motor of the rotating mirror is turned on when scanning is desired, thus making sweeps of the laser stripe. The camera simply collects images as the laser light sweeps. However, to obtain accurate scanned data for the object 101, it is necessary to calibrate some initial settings and positions used in calibrating the system.

Figure 14:
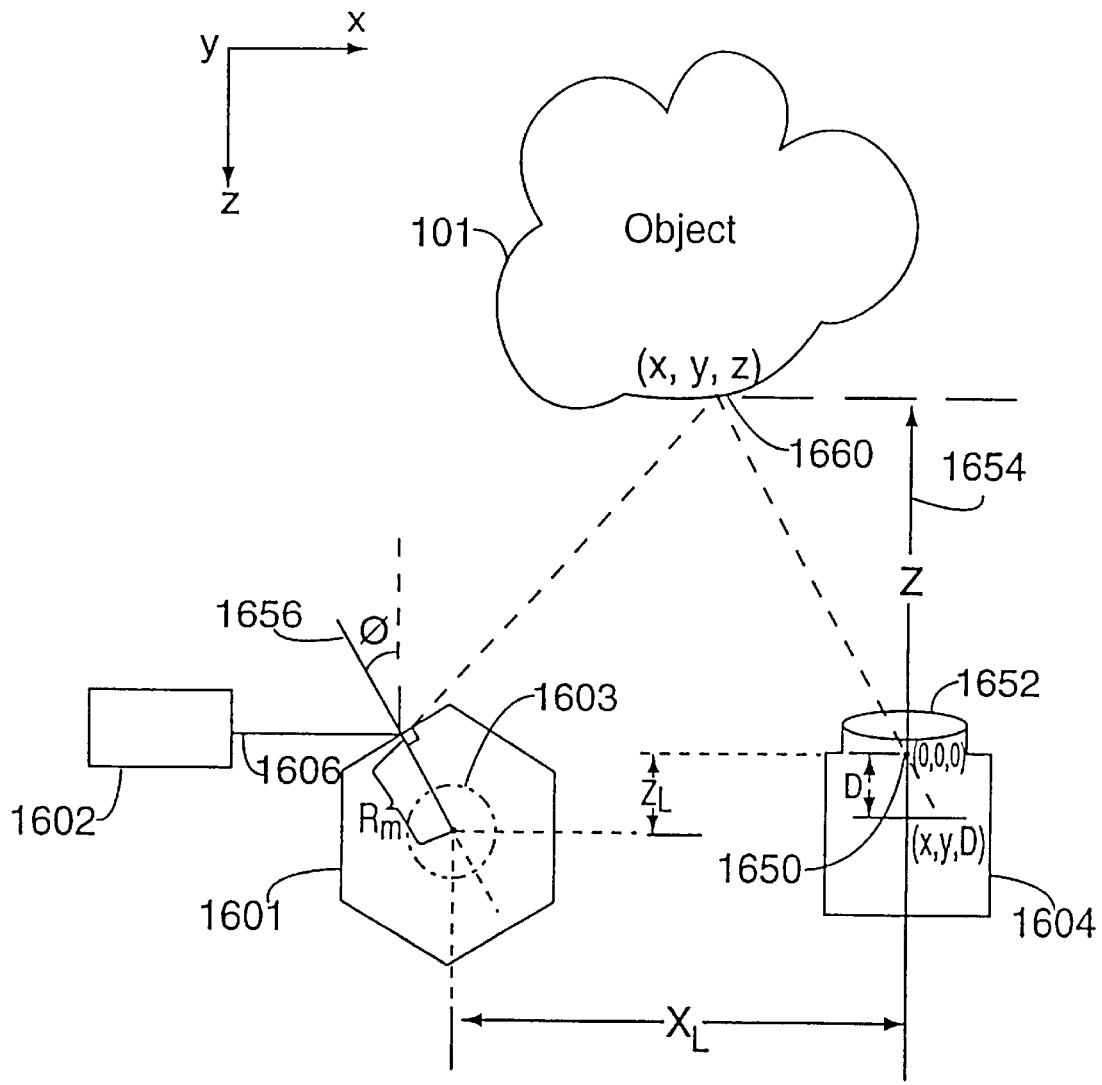
FIG. 14 Depicts an exemplary configuration of a portable scanning system showing the geometric relationships for calibration.

FIG. 14 illustrates the geometric parameters of the various components of the embodiment of the portable scanning system for calibration according to the present invention. As in the system described above, a coordinate system is provided in which the origin (0,0,0) locates at the focal point 1650 of the lens of image collector 1604. A Z axis 1654 is provided by the axis of the camera, an X axis projects from the focal point perpendicular to the Z axis, and the Y axis (not shown) projects perpendicularly from the figure drawing. The relational positions of the scanning apparatus are also used to make the triangulation calculation for each data point on the object, such as point 1660.

The basic parameters for scanning can be determined as described above. For example, the D value, showing the relationship between the focal point and the 2D photocollector (e.g., CCD chip) is determined as described above. However, additional calibration steps are necessary to calibrate the polygonal mirror. As each mirror facet represents a different mirror plane, a separate $\theta_0$ value for each mirror facet is important for accurate calibration. Additionally, since each mirror facet rotates at a distance apart from the axis of rotation of the mirror motor, a distance value for the mirror facet must also be determined and incorporated into the triangulation formulas. In this procedure, a distance $R_m$ for each mirror facet can be measured and its value incorporated into the triangulation formulas, described above. The distance $R_m$ is a measure of the length of the normal for a given mirror facet from the mirror's axis of rotation. That value can be incorporated into the triangulation formulas as $<\sigma, r>=d_m-R_m$ (where $d_m$ is the distance from the axis of rotation to the origin). Thus, in the calibration procedure for the portable scanner, the additional step angle $\theta_0$ is determined for the mirror position at the sensor area position 1902, the computer will use the relative angle positions to generate an angle $\theta_i$ position for each other position.

Figure 15:
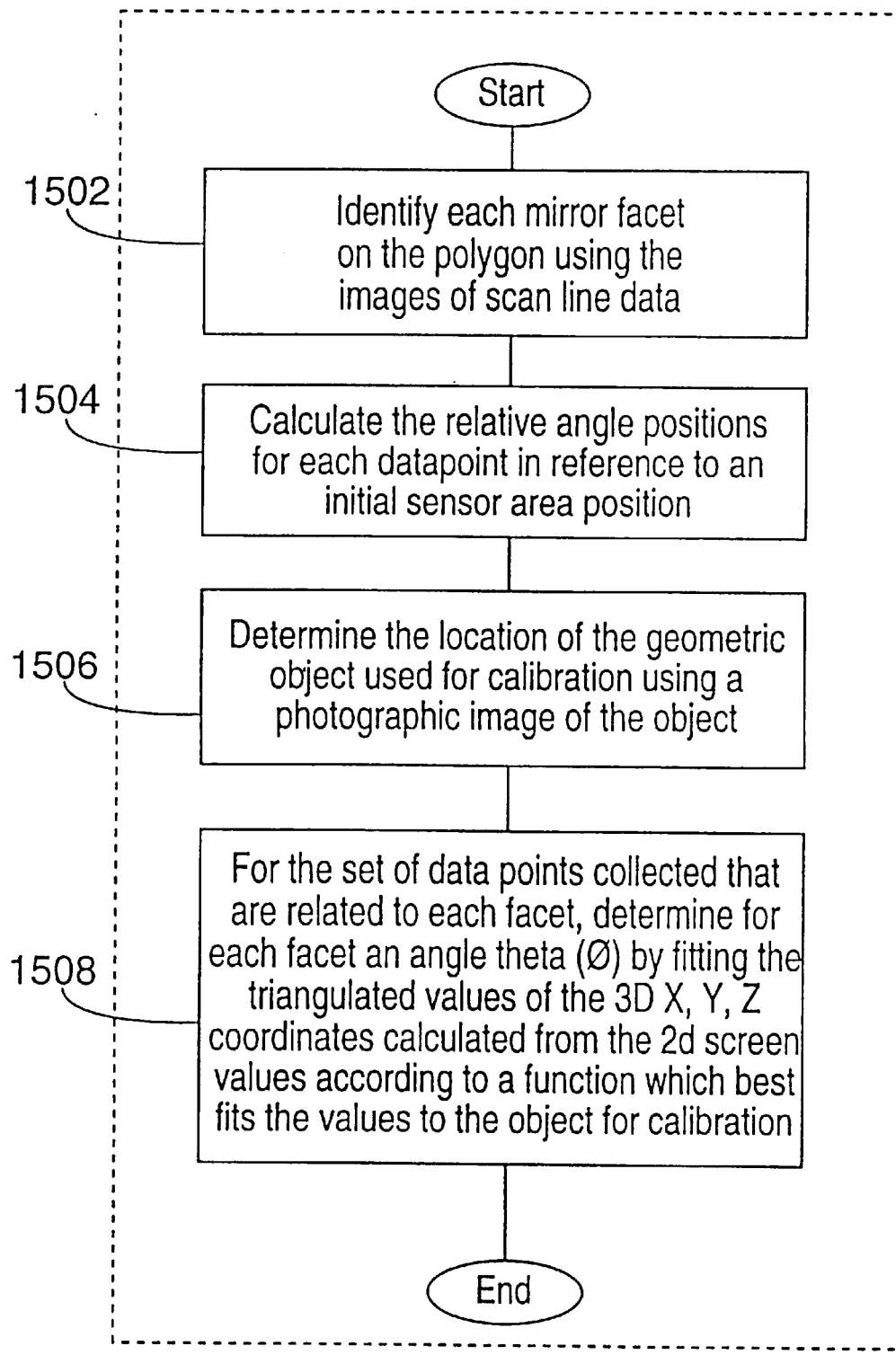
FIG. 15 Depicts an exemplary process flow for the calibration procedure of a portable scanning system.

Referring to the process flow of FIG. 15, after the computer identifies the initial sensor area position to identify each mirror in step 1502, the computer in step 1504 continues the procedure by determining a angle position $\varkappa_i$ relative to that sensor area point for each collected data point. After step 1506, the system begins the process of calibrating a $\theta_0$ position for each mirror facet.

As described above, 74 $_0$ was one parameter to calibrate by fitting the data such that it will conform to the known constraints of a geometric object such as object 1 or object 10. The scanned data collected contains a 2D pixel value for each coordinate, and (after step 1504) a relative angle for each point. Further, in calculating a 3D X,Y,Z value for each point, the present invention provides that each data point must fit the constraint imposed by the geometric object for calibration.

In the case of object 1, the constraint is that the points must lie on the plane. For that constraint, it is necessary to determine the location of that plane in space. In calibrating the portable scanner, the user can find a D value by capturing a photographic image of the device 400 properly aligned (see FIG. 7a). As described above it is possible to determine the location of the plane with a photographic image of object 1(see FIG. 8 and related discussion). The geometric pattern displayed on the object 1, such as the vertices of one of the depicted triangles, is used to calibrate the location of the object 1. The CPU 148 in step 1506 downloads one of the photographic images of the object 1 and analyzes that image to locate the object 1.

Referring again to FIG. 15, in step 1508 the program elements use the location of the object 1 and the scanned data collected about it to calibrate the initial $\theta_0$ position for each mirror. The programmed elements use the function of reconstruction for the 2D pixel coordinates x,y and the relative angle to reconstruct the 3D X,Y,Z points. For any data point collected the 3D coordinate can be determined by the function:

$$r_i = F(\theta_0, x_{ipixel}, y_{ipixel}, \varkappa_{start}, \varkappa_i, n \ldots)$$

where $r_i$ is the 3D coordinate for any 2D datapoint and F is the triangulation functions above, having as variables $\theta_0$, $x_i$, $y_i$ (the 2D pixel coordinates of the data point), $\varkappa_{start}$ (the motor's audio signal for the mirror at the sensor area position), and $\varkappa_i$ (the audio signal position for the motor for the point in question $(x_i, y_i)$) and other parameters n including a parameter to take into account the number of mirror facets in the polygon and the $R_m$ value (as shown in FIG. 14) which is the distance of the normal of the mirror facet from the motor's rotation axis.

For the given n data points (e.g., 20,000 scan points for each mirror) the present invention will then fit them to the plane of the object 1. A normal of the plane of the object n can be used to define the plane:

$$<n, r> = 1$$

And every $r_i$ point will fit within this plane such that:

$$F_i = <n, r_i> - 1$$

The calibration program elements demand that the sum of $F^2$ for all n is a minimum, such that:

$$\min \Sigma F_i^2$$

$i=0$ to $n$

The demand for a minimum ensures that the result of this summation will go in the direction of zero. To perform this fitting function, there are a variety of software programs (some are referenced below) both commercially and publicly available to perform this fitting by the least squares method. The software moves different values for $\theta_0$ to minimize the target function. In addition, and as described above, $Z_L$ and other calibration parameters can also be calibrated during this fitting. of calibration pertains to determining with high accuracy an initial angle of rotation $\theta_0$ for each mirror facet.

i. Determining an Initial Angle of Rotation for each Polygonal Mirror

FIG. 14 shows that the triangulation calculation for any point on the object takes into account the polygonal mirror position in the same general manner as was described above with regard to the galvanometric scanner. The mirror position can be determined by an angle $\theta_i$, created with reference to the normal vector of the mirror, and a set of basis vectors parallel to the axes of the coordinate system. And as described above, that angle $\theta_i$ can be determined with reference to an initial angle $\theta_0$ for each mirror and some incremental rotation movement value to describe any positional movement from the $\theta_0$. In the exemplary embodiment, that rotational movement is determinable from the known rotational movement of the motor which rotates the polygonal mirror.

FIG. 15 depicts an exemplary computer program procedure to analyze the frame images collected from the portable scanner and calibrate the parameters used for obtaining an initial $\theta_0$ for each mirror. Before collecting data concerning a desired object, such as a person's face, the user would first perform a data collection process to obtain calibration information. To calibrate, the user places an object for calibration such as the plane (object 1) or the sphere (object 10) before the scanner, such as in the position of object 101 in FIG. 13. The user collects data about the object by taking photographic images of the object for calibration (for example using light source 2003) and scanning the object (using the laser) to collect information concerning the object.

Figure 16:
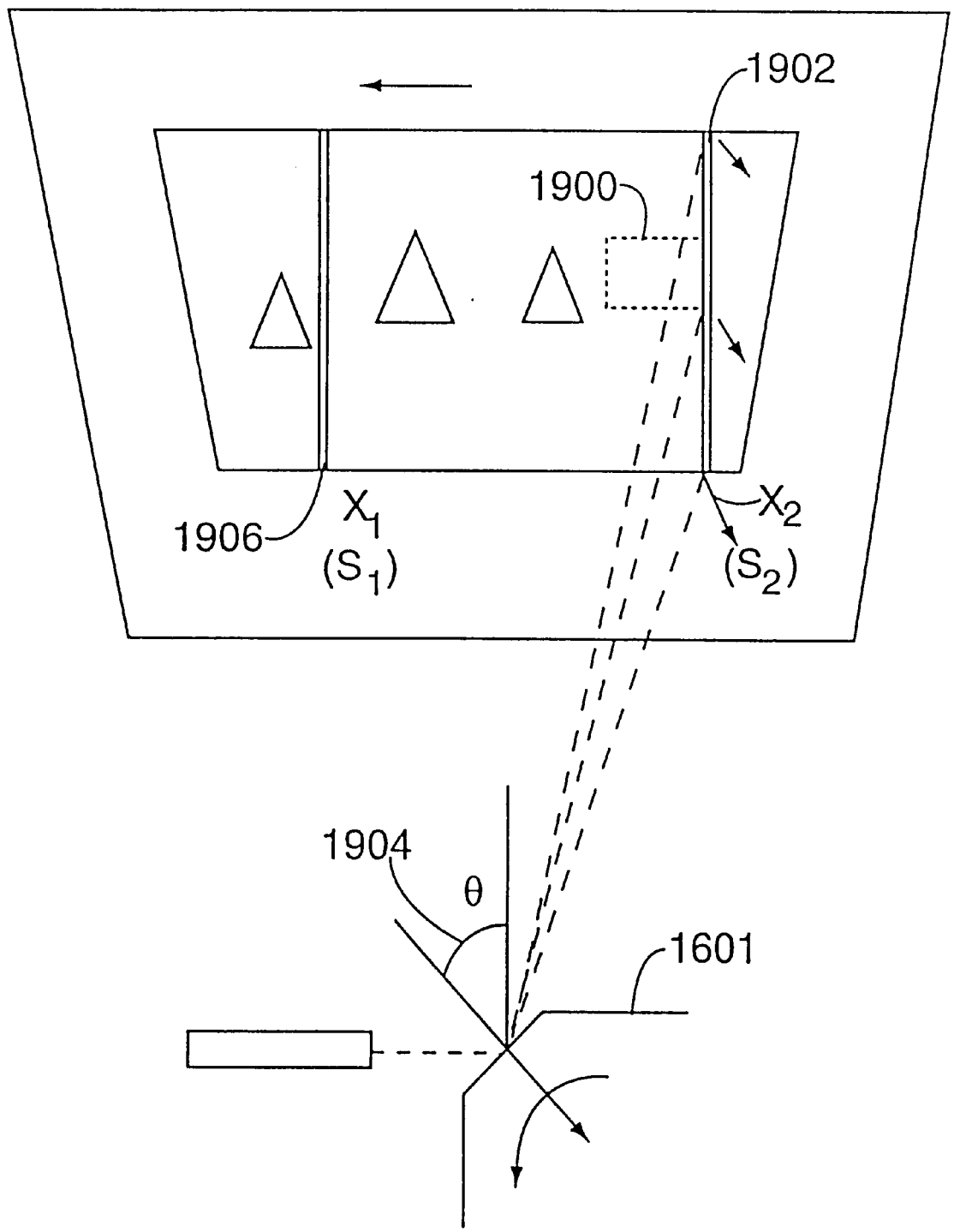
FIG. 16 Depicts an exemplary sensor area for determining an initial angle of rotation in a portable scanning system.

After scanning, the data can be fed into the computer and analyzed. Referring to FIG. 15, the first step 1502 is to identify the set of laser signals that come from each facet of the polygon mirror. As each facet of the polygon mirror creates a sweep of the laser plane across the object, the particular beams of each mirror move across the object. To identify the laser beam data for each mirror, the present invention provides that a designated area within the field of the camera's viewing area be used to mark the motor's rotation signal at the instant that the laser plane intersects the designated area. In FIG. 16 the polygonal mirror 1601 rotates a laser stripe across an object 1 for calibration. The camera (not shown) collects images which scan the object and contain the data. When the images are processed by computer, the user can designate a sensor area 1900 which the computer can monitor by examining each image to determine the instant when the laser stripe enters into the sensor area, such as at the point 1902. As the audio track is synchronized with the camera's collected images, the audio track will provide a sound assignment for the motor positions for this particular laser line. As the laser stripe for each mirror sweeps across the object, the sound positions can be determined which identify each mirror. These sound positions can be used to determine a $\theta_0$ for each mirror facet as described below.

For purposes of designating the location of the sensor area 1900, programmed elements output a photographic screen image of the object for calibration and designate with pixel value assignments the sensor area location. In an exemplary embodiment, the pixel sensor area is sized to guarantee that laser stripe data from each polygon mirror will cross the mirror sensor area 1900. In the exemplary embodiment, a sensor area of 40×16 pixels is selected. However, the size of the sensor area could vary depending on factors, such as the laser source used. As this position is also used to determine initial $\theta_0$ values for each mirror, it is also noted that the position angle created at this point provides more optimal results if the width of the angle 1904 created is within 60° for a six-sided object.

For a given mirror facet, all other laser positions placing laser stripes on the object 1 as the mirror moves can be determined with reference to the initial angle position. In FIG. 16 an initial motor position $S_2$ (position 1902) is taken where the laser stripe intersects the sensor area 1900. As the motor continues its rotation, it moves the stripe to a different position, e.g., position 1906. At this position 1906, the motor will output a different position signal $S_1$. As the motor rotates a full 360° for x number of signals, it is possible to determine for each position an angle position that is relative to the sensor area position 1902, based on the simple motor movement. Once an initial Many different libraries have optimization software suitable for the fitting, regression analysis and simultaneous equation solving functions performed as described herein. An overview of suitable optimization packages can be found at http://www.mcs.anl.gov/home/otc/Guide/SoftwareGuide/Categories/nonlinleastsq.html. Optimization software known as MINPACK and available through the NETLIB repository at http://www.netlib.com and related site addresses therein and TENSOLVE available through ftp://ftp.cs.colorado.edu/pub/cs/distribs/tensor/tensolve.tar.z contain suitable optimization software. For purposes of an exemplary embodiment, other commercial optimization software packages are also suitable and can be found in the IMSL (http://www.nui.con/adt.div/adt.html), NAG (http://www.nag.co.uk:70/) and LANCELOT (http://www.rl.ac.uk/departments/ccd/numerical/lancelot/lancelot.html) libraries. For more information concerning MINPACK, TENSOLVE, IMSL, NAG, LANCELOT and other optimization software, the reader is referred to the above referenced and related websites which are hereby expressly incorporated by reference herein.

The invention continues as described above. The above described embodiment of the invention is meant to be representative only, as certain changes may be made therein without departing from the clear teachings of the invention. Accordingly, reference should be made to the following claims which alone define the invention.

What we claim:

1. A system for determining the location of a light source relative to a image collector, the image collector comprising a lens with a focal point and a light collection device at a focal distance away from the lens which creates images based on the light which passes through the lens, the image collector comprised to capture images of objects and output information concerning the image, the light source placed at a location apart from the image collector and comprised to direct a beam of light on an object, the light beam comprised to reflect from the object the image collector comprised capture images of the object both when the light source projects the beam and when no beam is projected, the system comprising:

(a) a calibration object of a predetermined geometric form placed in a position for scanning, the calibration object being marked with a pre-selected geometric shape of known form, the geometric shape having a plurality of vertices of which the relative locations between vertices is also known;

(b) a computer comprising a processor coupled to a memory and adapted to accept information concerning an image of the calibration object output by the camera;

(c) the computer further adapted to process the information concerning the image of the calibration object and locate the two dimensional points within the image that describe the vertices the geometric shape;

(d) the computer being further adapted to calibrate the location of the calibration object by determining a three dimensional point value for each vertex according to a constraint by which the three dimensional point values must lie on the calibration object and maintain the relative known relationship to each other;

(e) the light source adapted to direct light beams to different positions about the object, and the image collector collecting images of the light beams as they reflect from the object;

(f) the computer further adapted to accept as input information concerning the images containing reflections of the light beams;

(g) the computer further adapted to locate within the two dimensional images a two dimensional coordinate for the reflected image of the light beam as it reflects from the calibration object;

(h) the computer further adapted to determine the location of the light source relative to the image collector by triangulating according to the determined focal distance a three dimensional coordinate from each two dimensional coordinate according to the constraint that the all the coordinates must lie on the calibration object at its location.

2. A system for calibrating the initial settings in a scanning system which collects three dimensional data about an object by triangulation, the scanning system comprising a light source which positions a beam of light on an object, the beam of light being comprised to reflect from the object, an image collector being located at a position relative to the light source and comprising a lens system and a two dimensional light collection device and configured to capture and output a set of signals comprising a two dimensional image both when no beam of light has been projected and when the light source positions a beam reflects from the object for capture in the image, and a computer coupled to the light source and image collector and comprised of a processor, memory and programmed elements to control the placement of beams of light on the object and accept the output of images from the camera, the system for calibration comprising:

(a) a calibration object of a predetermined geometric form placed in a position for scanning, the calibration object being marked with a pre-selected geometric shape of known form, the geometric shape having a plurality of vertices of which the relative locations between vertices is also known;

(b) a computer comprising a processor coupled to a memory and comprised accept information concerning an image of the calibration object output by the camera;

(c) the computer further adapted to process the information concerning the image of the calibration object and locate the two dimensional points within the image that describe the vertices the geometric shape;

(d) the computer being further adapted to calibrate the focal distance and the location of the calibration object by determining a three dimensional point value for each vertex according to a constraint by which the three dimensional point values must lie on the calibration object and maintain the relative known relationship to each other;

(e) the light source adapted to direct light beams to different positions about the object, and the image collector being comprised to collect images of the light beams as the reflect from the object;

(f) the computer further adapted to accept as input information concerning the images containing reflections of the light beams;

(g) the computer further adapted to locate within the two dimensional images a two dimensional coordinate for the reflected image of the light beam as it reflects from the calibration object; and (h) the computer further adapted to determine the location of the light source relative to the image collector by triangulating according to the determined focal distance a three dimensional coordinate from each two dimensional coordinate according to the constraint that the all the coordinates must lie on the calibration object at its location.

3. A method for determining the location of a light source relative to a image collector, the image collector comprising a lens with a focal point and a light collection device at a focal distance away from the lens which creates images based on the light which passes through the lens, the image collector comprised to capture images of objects and output information concerning the image, the light source placed at a location apart from the image collector and comprised to direct a beam of light on an object, the light beam comprised to reflect from the object the image collector comprised capture images of the object both when the light source projects the beam and when no beam is projected, the method comprising the steps of:

(a) placing a calibration object of a predetermined geometric form in a position for scanning, the calibration object being marked with a pre-selected geometric shape of known form, the geometric shape having a plurality of vertices of which the relative locations between vertices is also known;

(b) outputting an image of the object by the camera and accepting the image in a computer comprising a processor coupled to a memory and adapted to accept information concerning an image of the calibration object output by the camera;

(c) processing with the computer the image of the calibration object to locate the two dimensional points within the image that describe the vertices the geometric shape;

(d) calibrating the focal distance and the location of the calibration object with the computer by determining a three dimensional point value for each vertex according to a constraint by which the three dimensional point values must lie on the calibration object and maintain the relative known relationship to each other;

(e) directing light beams from the light source to different positions about the object, and collecting in the image collector images of the light beams as they reflect from the object;

(f) accepting information concerning the images containing reflections of the light beams in the computer;

(g) locating with the computer within the two dimensional images a two dimensional coordinate for the reflected image of the light beam as it reflects from the calibration object;

(h) determining with the computer the location of the light source relative to the image collector by triangulating according to the determined focal distance a three dimensional coordinate from each two dimensional coordinate according to the constraint that the all the coordinates must lie on the calibration object at its location.

4. A method for calibrating the initial settings in a scanning system which collects three dimensional data about an object by triangulation, the scanning system comprising a light source which positions a beam of light on an object, the beam of light being comprised to reflect from the object, an image collector being located at a position relative to the light source and comprising a lens system and a two dimensional light collection device and configured to capture and output a set of signals comprising a two dimensional image both when no beam of light has been projected and when the light source positions a beam reflects from the object for capture in the image, and a computer coupled to the light source and image collector and comprised of a processor, memory and programmed elements to control the placement of beams of light on the object and accept the output of images from the camera, the method for calibration comprising the steps of:

(a) placing a calibration object of a predetermined geometric form in a position for scanning, the calibration object being marked with a pre-selected geometric shape of known form, the geometric shape having a plurality of vertices of which the relative locations between vertices is also known;

(b) accepting information concerning an image of the object with a computer comprising a processor coupled to a memory and comprised accept information concerning an image of the calibration object output by the camera;

(c) processing with the computer the information concerning the image of the calibration object to locate the two dimensional points within the image that describe the vertices the geometric shape;

(d) calibrating the focal distance and the location of the calibration object with computer processing by determining a three dimensional point value for each vertex according to a constraint by which the three dimensional point values must lie on the calibration object and maintain the relative known relationship to each other;

(e) directing with the light source light beams to different positions about the object, and the image collector being comprised to collect images of the light beams as the reflect from the object; (f) accepting information concerning the images with the computer further adapted to accept as input information concerning the images containing reflections of the light beams;

(g) locating within the two dimensional images a two dimensional coordinate for the reflected image of the light beam as it reflects from the calibration object; and (h) determining with the computer the location of the light source relative to the image collector by triangulating according to the determined focal distance a three dimensional coordinate from each two dimensional coordinate according to the constraint that the all the coordinates must lie on the calibration object at its location.

* * * * *